United States Patent
Honda

(10) Patent No.: US 11,629,267 B2
(45) Date of Patent: Apr. 18, 2023

(54) CURABLE COMPOSITION

(71) Applicant: DAIKIN INDUSTRIES, LTD., Osaka (JP)

(72) Inventor: Yoshiaki Honda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/757,605

(22) PCT Filed: Oct. 30, 2018

(86) PCT No.: PCT/JP2018/040400
§ 371 (c)(1),
(2) Date: Apr. 20, 2020

(87) PCT Pub. No.: WO2019/088129
PCT Pub. Date: May 9, 2019

(65) Prior Publication Data
US 2020/0325279 A1    Oct. 15, 2020

(30) Foreign Application Priority Data

Oct. 31, 2017   (JP) .............................. JP2017-211212

(51) Int. Cl.
| | | |
|---|---|---|
| *C09D 171/00* | (2006.01) | |
| *C08G 65/336* | (2006.01) | |
| *C08G 65/00* | (2006.01) | |
| *C08G 77/46* | (2006.01) | |
| *C08G 77/50* | (2006.01) | |
| *C08L 71/00* | (2006.01) | |
| *C08K 5/5419* | (2006.01) | |
| *C08K 5/57* | (2006.01) | |

(52) U.S. Cl.
CPC ......... *C09D 171/00* (2013.01); *C08G 65/007* (2013.01); *C08G 65/336* (2013.01); *C08G 77/46* (2013.01); *C08G 77/50* (2013.01); *C08K 5/5419* (2013.01); *C08K 5/57* (2013.01); *C08L 71/00* (2013.01)

(58) Field of Classification Search
CPC ............................ C08G 65/007; C08G 65/336
See application file for complete search history.

(56) References Cited

U.S. PATENT DOCUMENTS

| | | | |
|---|---|---|---|
| 5,705,591 A | 1/1998 | Matsuda et al. | |
| 6,218,499 B1* | 4/2001 | Tarumi .................. | C08G 65/007 528/30 |
| 2003/0124361 A1* | 7/2003 | Moore .................. | C08G 65/336 428/447 |
| 2004/0176555 A1 | 9/2004 | Guarda et al. | |
| 2009/0299001 A1* | 12/2009 | Sato ..................... | C09D 171/02 524/588 |
| 2012/0097159 A1* | 4/2012 | Iyer ........................ | B65D 83/38 106/287.11 |
| 2013/0136928 A1* | 5/2013 | Yamane ............... | C09D 183/12 428/421 |
| 2015/0307719 A1* | 10/2015 | Mitsuhashi ............. | C07F 7/188 428/447 |
| 2016/0319071 A1 | 11/2016 | Sakoh et al. | |
| 2016/0355638 A1* | 12/2016 | Sakoh .................. | C08G 65/007 |
| 2017/0044315 A1 | 2/2017 | Mitsuhashi et al. | |

FOREIGN PATENT DOCUMENTS

| | | |
|---|---|---|
| EP | 3 578 586 A1 | 12/2019 |
| EP | 3 705 530 A1 | 9/2020 |
| JP | 7-53919 | 2/1995 |
| JP | 9-77777 A | 3/1997 |
| JP | 2004-263185 A | 9/2004 |
| JP | 2008-214566 A | 9/2008 |
| JP | 2014-503380 A | 2/2014 |
| JP | 2015-168785 A | 9/2015 |
| JP | 2015-221888 A | 12/2015 |
| WO | 2012/064646 A1 | 5/2012 |
| WO | WO 2014/069592  * | 5/2014 |

OTHER PUBLICATIONS

International Search Report for PCT/JP2018/040400 dated Jan. 22, 2019 [PCT/ISA/210].
International Preliminary Report on Patentability with the translation of Written Opinion dated May 5, 2020 from the International Bureau in International application No. PCT/JP2018/040400.
Extended European Search Report dated Jul. 29, 2021, issued by the European Patent Office in application No. 18874227.4.
Marchionni, Giuseppe et al., "Structure-Property Relationships in Perfluropolyethers: A Family of Polymeric Oils", Comprehensive Polymer Science and Supplements, 1989, 347-388.
Tonelli, Claudio et al., "New fluorinated thermoplastic elastomers" Journal of Applied Polymer Science, 1996, 59(2), 311-327.
Riganti, Fabio et al., "Characterization and Tribological Performances of a New Family of Linear PFPEs", World Tribology Congress 2009, Japanese Society of Tribologists (http://www.tribology.jp), Tribology Online vol. 1 (2005), 24 pages.

* cited by examiner

*Primary Examiner* — Marc S Zimmer
(74) *Attorney, Agent, or Firm* — Sughrue Mion, PLLC

(57) ABSTRACT

A curable composition including a perfluoro(poly)ether group-containing silane compound having two or more Si atoms each bonding to at least one selected from a hydroxyl and hydrolyzable group, and a group represented by: —$(OC_6F_{12})_a$—$(OC_5F_{10})_b$—$(OC_4F_8)_c$—$(OC_3X^{10}_6)_d$—$(OC_2F_4)_e$—$(OCF_2)_f$—, wherein a, b, c and d are each independently an integer of 0 to 30, e and f are each independently an integer of 1 to 200, the sum of a, b, c, d, e and f is 5 or more, the occurrence order of the respective repeating units with the subscript a, b, c, d, e or f is not limited, a ratio of e to f is 1.0 or more, and each $X^{10}$ is independently a hydrogen, fluorine or chlorine atom; an organosilicon compound having at least two —O—$R^{g3}$(s) each bonding to a Si atom, wherein each $R^{g3}$, at each occurrence, is independently a hydrogen atom or a monovalent organic group; and a catalyst.

9 Claims, No Drawings

CURABLE COMPOSITION

CROSS REFERENCE TO RELATED APPLICATIONS

This application is a National Stage of International Application No. PCT/JP2018/040400 filed Oct. 30, 2018, claiming priority based on Japanese Patent Application No. 2017-211212 filed Oct. 31, 2017.

TECHNICAL FIELD

The present invention relates to a curable composition.

BACKGROUND ART

A composition including a certain fluoro(poly)ether-based compound has excellent water-repellency, oil-repellency, and the like. For example, Patent Literature 1 describes rubber where a cured film of a room temperature curing perfluoro(poly)ether composition is formed on the surface of the rubber, and describes the following: there is provided rubber to which releaseability, solvent resistance, chemical resistance, weather resistance, water-repellency, oil-repellency, and the like are imparted. Examples of Patent Literature 1 describe a composition using a compound having, as a perfluoro(poly)ether structure, $(OCF_2CF(CF_3))_m OCF_2CF_2O(CF(CF_3)CF_2O)_n$, wherein m+n=90.

CITATION LIST

Patent Literature

Patent Literature 1: JP 2008-214566 A

SUMMARY OF INVENTION

Technical Problem

Such a composition may be demanded to enable a cured product which is usable at a low temperature (for example, a temperature of 0° C. or less) to be formed depending on its usage, in the semiconductor manufacturing equipment field. It, however, have found according to studies by the present inventor that a cured product of the composition described in Examples of Patent Literature 1 cannot sometimes keep rubber properties when used at a low temperature and thus may be unsuitable for use at a low temperature. As a decomposed material formed by heating may be a contamination source, the cured product may be demanded to be hardly decomposed at a high temperature because a decomposed product, if generated by heating, can serve as a contamination source.

An object of the present invention is to provide a curable composition which is suitable for formation of a cured product suitable for use at a low temperature, for example, a cured product with low elastic modulus ratio at a low temperature (for example, the ratio of the elastic modulus at −50° C. to the elastic modulus at 0° C.), and which is suitable for forming the cured product not easy to be decomposed at a high temperature.

Solution to Problem

A first aspect of the present invention provides
a curable composition including
a perfluoro(poly)ether group-containing silane compound which is a compound having two or more Si atoms each bonding to at least one group selected from the group consisting of a hydroxyl group and a hydrolyzable group, and a perfluoro(poly)ether group, wherein the perfluoro(poly)ether group is a group represented by formula:

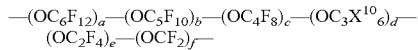

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.0 or more, and each $X^{10}$, at each occurrence, is independently a hydrogen atom, a fluorine atom or a chlorine atom, an organosilicon compound having at least two —O—$R^{g3}$(s) each bonding to a Si atom, wherein each $R^{g3}$, at each occurrence, is independently a hydrogen atom or a monovalent organic group, and a catalyst.

Advantageous Effects of Invention

The present invention can provide a curable composition which is suitable for forming of a cured product suitable for use at a low temperature, for example, a cured product with low elastic modulus ratio at a low temperature (for example, the ratio of the elastic modulus at −50° C. to the elastic modulus at 0° C.), and the cured product which is hardly decomposed at a high temperature.

DESCRIPTION OF EMBODIMENTS

Hereinafter, the curable composition of the present invention will be described.

The curable composition of the present invention includes
a perfluoro(poly)ether group-containing silane compound which is a compound having two or more Si atoms each bonding to at least one group selected from the group consisting of a hydroxyl group and a hydrolyzable group, and a perfluoro(poly)ether group, wherein the perfluoro(poly)ether group is a group represented by formula:

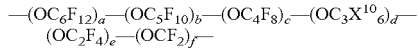

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, the ratio of e to f is 1.0 or more, and each $X^{10}$, at each occurrence, is independently a hydrogen atom, a fluorine atom or a chlorine atom (hereinafter, sometimes referred to as "PFPE-containing silane compound (a)"), an organosilicon compound having at least two —O—$R^{g3}$(s) each bonding to a Si atom, wherein each $R^{g3}$, at each occurrence, is independently a hydrogen atom or a monovalent organic group (hereinafter, sometimes referred to as "cross-linking agent"), and a catalyst.

(PFPE-Containing Silane Compound (a))

The PFPE-containing silane compound (a) is a compound having two or more Si atoms each bonding to at least one group selected from the group consisting of a hydroxyl group and a hydrolyzable group, and a perfluoro(poly)ether group.

The "hydrolyzable group" herein means a group which can undergo a hydrolysis reaction, namely, means a group which can be removed from a main backbone of the compound by a hydrolysis reaction. Examples of the hydrolyzable group include —OR, —OCOR, —O—N=CR$_2$, —NR$_2$, —NHR, and a halogen atom, wherein R represents a substituted or unsubstituted alkyl group having 1 to 4 carbon atoms, and —OR (namely, an alkoxy group) is preferable. Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group is not limited, and may be generated by hydrolyzing the hydrolyzable group. Examples of the halogen atom can include a fluorine atom, a chlorine atom, a bromine atom and an iodine atom, and in particular, a chlorine atom is preferable.

Such a Si atom bonding to at least one group selected from the group consisting of a hydroxyl group and a hydrolyzable group is preferably present at each of both ends of a molecular backbone of the PFPE-containing silane compound (a). The molecular backbone of the PFPE-containing silane compound (a) here represents a relatively longest binding chain in a molecule of the PFPE-containing silane compound (a).

The perfluoro(poly)ether group is a group represented by formula:

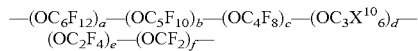

wherein a, b, c and d are each independently an integer of 0 or more and 30 or less, and e and f are each independently an integer of 1 or more and 200 or less. Preferably, the sum of a, b, c, d, e and f is 5 or more, more preferably 10 or more, for example, 10 or more and 200 or less. The occurrence order of the respective repeating units in parentheses with the subscript a, b, c, d, e or f is not limited in the formula. The ratio of e to f (hereinafter, referred to as "e/f ratio") is 1.0 or more. Each $X^{10}$, at each occurrence, independently represents a hydrogen atom, a fluorine atom or a chlorine atom, preferably a hydrogen atom or a fluorine atom, more preferably a fluorine atom. Hereinafter, the perfluoro(poly) ether group having such a structure is sometimes referred to as "PFPE$^1$". The curable composition of the present invention has such PFPE$^1$, and thus a cured product of the curable compound can have a low glass transition temperature (Tg).

Here, a and b are each independently preferably 0 or more and 30 or less, and, for example, may be 0.

In one embodiment, a, b, c and d are each independently preferably an integer of 0 or more and 30 or less, more preferably an integer of 20 or less, particularly preferably an integer of 10 or less, further preferably an integer of 5 or less, or, for example, may be 0.

In one embodiment, the sum of a, b, c and d is preferably 30 or less, more preferably 20 or less, further preferably 10 or less, particularly preferably 5 or less.

In one embodiment, the sum of e and f is preferably 30 or more, more preferably 40 or more, further preferably 50 or more.

Such repeating units may, for example, be linear or branched, and are preferably linear. For example, —(OC$_6$F$_{12}$)— may be —(OCF$_2$CF$_2$CF$_2$CF$_2$CF$_2$CF$_2$)—, —(OCF(CF$_3$)CF$_2$CF$_2$CF$_2$CF$_2$)—, —(OCF$_2$CF(CF$_3$) CF$_2$CF$_2$CF$_2$)—, —(OCF$_2$CF$_2$CF(CF$_3$)CF$_2$CF$_2$)—, —(OCF$_2$CF$_2$CF$_2$CF(CF$_3$)CF$_2$)—, —(OCF$_2$CF$_2$CF$_2$CF$_2$CF (CF$_3$))—, or the like, and is preferably —(OCF$_2$CF$_2$CF$_2$CF$_2$CF$_2$CF$_2$)—. For example, —(OC$_5$F$_{10}$)— may be —(OCF$_2$CF$_2$CF$_2$CF$_2$CF$_2$)—, —(OCF(CF$_3$)CF$_2$CF$_2$CF$_2$)—, —(OCF$_2$CF(CF$_3$) CF$_2$CF$_2$)—, —(OCF$_2$CF$_2$CF(CF$_3$)CF$_2$)—, —(OCF$_2$CF$_2$CF$_2$CF(CF$_3$))—, or the like, and is preferably —(OCF$_2$CF$_2$CF$_2$CF$_2$CF$_2$)—. —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC (CF$_3$)$_2$CF$_2$)—, —(OCF$_2$C(CF$_3$)$_2$)—, —(OCF(CF$_3$)CF (CF$_3$))—, —(OCF$_2$(C$_2$F$_5$)CF$_2$)— and —(OCF$_2$CF(C$_2$F$_5$))—, and is preferably —(OCF$_2$CF$_2$CF$_2$CF$_2$)—. —(OC$_3$F$_6$)— (namely, in the formulae, $X^{10}$ represents a fluorine atom) may be any of —(OCF$_2$CF$_2$CF$_2$)—, —(OCF(CF$_3$)CF$_2$)— and —(OCF$_2$CF(CF$_3$))—, and is preferably —(OCF$_2$CF$_2$CF$_2$)—. —(OC$_2$F$_4$)— may be any of —(OCF$_2$CF$_2$)— and —(OCF(CF$_3$))—, and is preferably —(OCF$_2$CF$_2$)—.

In one embodiment, PFPE$^1$ has a linear repeating unit. In the present embodiment, the molecular mobility at a low temperature of the PFPE-containing silane compound (a) is hardly decreased. The PFPE-containing compound (a) has a linear repeating unit, then a physical property value (for example, elastic modulus at a low temperature) of the PFPE-containing silane compound (a) is hardly decreased as compared with a value at room temperature. Herein, the "elastic modulus" indicates dynamic elastic modulus, more specifically storage elastic modulus.

Preferably, PFPE$^1$ is —(OC$_4$F$_8$)$_c$—(OC$_3$F$_6$)$_d$—(OC$_2$F$_4$)$_e$—(OCF$_2$)$_f$—, wherein c and d are each independently an integer of 0 or more and 30 or less, and e and f are each independently an integer of 1 or more and 200 or less, preferably 5 or more and 200 or less, more preferably 10 or more and 200 or less, and the occurrence order of the respective repeating units in parentheses with the subscript c, d, e or f is not limited in the formula. Preferably, PFPE$^1$ is —(OCF$_2$CF$_2$CF$_2$CF$_2$)$_c$—(OCF$_2$CF$_2$CF$_2$)$_d$—(OCF$_2$CF$_2$)$_e$—(OCF$_2$)$_f$—. In one embodiment, PFPE$^1$ may be —(OC$_2$F$_4$)$_e$—(OCF$_2$)$_f$—, wherein e and f are each independently an integer of 1 or more and 200 or less, preferably 5 or more and 200 or less, more preferably 10 or more and 200 or less, and the occurrence order of the respective repeating units in parentheses with the subscript e or f is not limited in the formulae.

More preferably, PFPE$^1$ is —(OC$_2$F$_4$)$_e$—(OCF$_2$)$_f$—, wherein e and f are each independently an integer of 1 or more and 200 or less, preferably 5 or more and 200 or less, more preferably 10 or more and 200 or less, and the occurrence order of the respective repeating units in parentheses with the subscript e or f is not limited in the formula.

In PFPE$^1$, the ratio of the sum of e and f to the sum of a, b, c, d, e and f is preferably 0.80 or more, more preferably 0.90 or more, further preferably 0.98 or more, particularly preferably 0.99 or more.

In PFPE$^1$, the e/f ratio is 1.0 or more, preferably 1.1 or more, further preferably 1.2 or more. The e/f ratio is preferably 10.0 or less, more preferably 5.0 or less, further preferably 2.0 or less, particularly preferably 1.5 or less.

In PFPE$^1$, the e/f ratio is preferably 1.0 or more and 10.0 or less, more preferably 1.0 or more and 5.0 or less, further preferably 1.0 or more and 2.0 or less, particularly preferably 1.0 or more and 1.5 or less.

A cured product of the curable composition of the present invention is hardly decomposed at a high temperature. The cured product being "hardly decomposed at a high temperature" herein means that the temperature of 1% decomposition of the cured product is a relatively high temperature.

That is, the curable composition of the present invention can contribute to formation of a cured product usable in a wide temperature range. The "temperature of 1% decomposition" here means a temperature at which 1% by mass of a cured product relative to the entire cured product is decomposed. The temperature of 1% decomposition means a value obtained by measurement according to thermogravimetric/differential thermal analysis (TG/DTA), and is specifically measured in the range from 25° C. to 600° C. at a temperature-increasing rate of 10° C./min under an air atmosphere. Examples of the TG/DTA can include DTG-60 manufactured by Shimadzu Corporation.

A cured product of the curable composition of the present invention has above-mentioned $PFPE^1$, and thus can have an appropriate elastic modulus even when used at a low temperature (for example, the ratio of the elastic modulus at −50° C. to the elastic modulus at 0° C. can be decreased). Accordingly, the curable composition of the present invention can contribute to formation of a cured product which can keep rubber properties even at a low temperature, and the cured product can be suitable for use at a low temperature.

The number average molecular weight of the -$PFPE^1$-moiety can be in the range from 2,000 to 200,000, and is preferably in the range from 3,000 to 100,000. The number average molecular weight is defined as a value obtained by $^{13}F$-NMR measurement.

In one embodiment, the number average molecular weight of the -$PFPE^1$-moiety can be in the range from 2,000 to 10,000, and is preferably in the range from 2,000 to 3,000. The compound can have such a number average molecular weight of the -$PFPE^1$-moiety to thereby allow the curable composition to be low in viscosity and be improved in handleability. The curable composition having such a number average molecular weight of the -$PFPE^1$-moiety, when, for example, used with a solvent to be formed into a solution, also has the advantage of suppression of the viscosity of such a solution.

In one embodiment, the number average molecular weight of the -$PFPE^1$-moiety can be in the range from 10,000 to 100,000, and is preferably in the range from 10,000 to 50,000. The compound can have such a number average molecular weight of the -$PFPE^1$-moiety to thereby allow the curable composition to be improved in physical properties such as stretching properties after curing.

The PFPE-containing silane compound (a) is preferably at least one compound represented by formula (A), (B), (C) or (D).

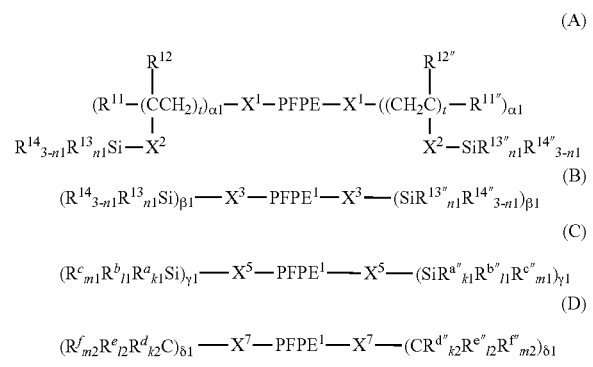

Hereinafter, such any PFPE-containing silane compound (a) represented by formulae (A), (B), (C) and (D) will be described.

The "di- to decavalent organic group", as used herein, means a di- to decavalent group containing carbon. The di- to decavalent organic group is not limited, and examples thereof include a di- to decavalent group where 1 to 9 hydrogen atoms are further removed from a hydrocarbon group. The divalent organic group is not limited, and examples thereof include a divalent group where one hydrogen atom is further removed from a hydrocarbon group.

The "hydrocarbon group", as used herein, means a group which contains carbon and hydrogen and which is obtained by removing one hydrogen atom from a molecule. The hydrocarbon group is not limited, and examples thereof include a hydrocarbon group having 1 to 20 carbon atoms, optionally substituted with one or more substituents, such as an aliphatic hydrocarbon group and an aromatic hydrocarbon group. For example, the "aliphatic hydrocarbon group" may be any linear, branched or cyclic group, and may be any saturated or unsaturated group. For example, the hydrocarbon group may contain one or more ring structures. The hydrocarbon group may have one or more N, O, S, Si, amide, sulfonyl, siloxane, carbonyl, carbonyloxy, and the like at an end thereof or in a molecular chain thereof.

Each substituent of the "hydrocarbon group", as used herein, is not limited, and examples thereof include a halogen atom; and one or more groups selected from a $C_{1-6}$ alkyl group, a $C_{2-6}$ alkenyl group, a $C_{2-6}$ alkynyl group, a $C_{3-10}$ cycloalkyl group, a $O_{3-10}$ unsaturated cycloalkyl group, a 5 to 10-membered heterocyclyl group, a 5 to 10-membered unsaturated heterocyclyl group, a $C_{6-10}$ aryl group and a 5 to 10-membered heteroaryl group each optionally substituted with one or more halogen atoms.

The alkyl group and the phenyl group may be herein unsubstituted or substituted, unless particularly noted. Each substituent of such groups is not limited, and examples thereof include one or more groups selected from a halogen atom, a $C_{1-6}$ alkyl group, a $C_{2-6}$ alkenyl group and a $C_{2-6}$ alkynyl group.

Formula (A)

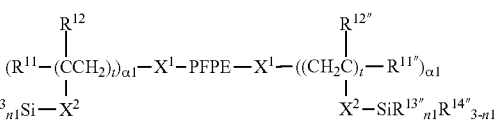

In the formulae, $PFPE^1$ has the same meaning as described above.

In the formulae, each $R^{13}$, at each occurrence, independently represents a hydroxyl group or a hydrolyzable group. The hydrolyzable group has the same meaning as described above.

In the formulae, each $R^{14}$, at each occurrence, independently represents a hydrogen atom or an alkyl group having 1 to 22 carbon atoms, preferably an alkyl group having 1 to 4 carbon atoms.

In the formulae, each $R^{11}$, at each occurrence, independently represents a hydrogen atom or a halogen atom. The halogen atom is preferably an iodine atom, a chlorine atom or a fluorine atom, more preferably a fluorine atom.

In the formulae, each $R^{12}$, at each occurrence, independently represents a hydrogen atom or a lower alkyl group.

The lower alkyl group is preferably an alkyl group having 1 to 20 carbon atoms, more preferably an alkyl group having 1 to 6 carbon atoms, and examples thereof include a methyl group, an ethyl group and a propyl group.

In the formulae, $R^{11''}$, $R^{12''}$, $R^{13''}$ and $R^{14''}$ have the same meanings as $R^{11}$, $R^{12}$, $R^{13}$ and $R^{14}$, respectively.

In formula (A), such a Si atom bonding to at least one group selected from the group consisting of a hydroxyl group and a hydrolyzable group indicates a Si atom contained in $(-SiR^{13}_{n1}R^{14}_{3-n1})$ or $(-SiR^{13''}_{n1}R^{14''}_{3-n1})$ where n1 is an integer of 1 to 3.

In the formulae, n1 with respect to each $(-SiR^{13}_{n1}R^{14}_{3-n1})$ unit or each $(-SiR^{13''}_{n1}R^{14''}_{3-n1})$ unit is independently an integer of 0 to 3, preferably 1 to 3, more preferably 3. In the formulae, at least two n1(s) are each an integer of 1 to 3, namely, there is not any case where all n1(s) are simultaneously 0. That is, at least two Si atoms each bonding to $R^{13}$ or $R^{13''}$ are present in the formula. In other words, at least two structures selected from the group consisting of a $-SiR^{13}_{n1}R^{14}_{3-n1}$ structure (namely, $-SiR^{13}$ moiety) where n1 is 1 or more and a $-SiR^{13''}_{n1}R^{14''}_{3-n1}$ structure (namely, $-SiR^{13''}$ moiety) where n1 is 1 or more are present in formula (A).

Preferably, the Si atom bonding to at least one group selected from the group consisting of a hydroxyl group and a hydrolyzable group is present at both ends of a molecular backbone in formula (A). That is, at least one $-SiR^{13}_{n1}R^{14}_{3-n1}$ structure (namely, $-SiR^{13}$ moiety) where n1 is 1 or more and at least one $-SiR^{13''}_{n1}R^{14''}_{3-n1}$ structure (namely, $-SiR^{13''}$ moiety) where n1 is 1 or more are present in formula (A).

In the formulae, each $X^1$ independently represents a single bond or a di- to decavalent organic group. $X^1$ is understood to be a linker which links a perfluoro(poly)ether moiety (namely, $-PFPE^1$-moiety) mainly providing water-repellency, surface lubricity, and the like, and a silane moiety (namely, group in parentheses with α1) providing a binding ability to the base material, in any compound represented by formula (A). Accordingly, $X^1$ may be a single bond or any organic group as long as such any compound represented by formula (A) can be stably present. Herein, a left portion and a right portion of the group designated as $X^1$ are bonding to the group represented by $PFPE^1$ and the group in parentheses with α1, respectively.

In another embodiment, $X^1$ can be $X^e$. $X^e$ represents a single bond or a di- to decavalent organic group, preferably represents a single bond or a di- to decavalent organic group having at least one selected from the group consisting of $-C_6H_4-$ (namely, -phenylene-, hereinafter, representing a phenylene group), $-CO-$ (carbonyl group), $-NR^4-$ and $-SO_2-$. Each $R^4$ independently represents a hydrogen atom, a phenyl group, or a $C_{1-6}$ alkyl group (preferably a methyl group), preferably represents a hydrogen atom or a methyl group. Such $-C_6H_4-$, $-CO-$, $-NR^4-$ or $-SO_2-$ is preferably contained in a molecular backbone of the PFPE-containing silane compound (a).

$X^e$ more preferably represents a single bond or a di- to decavalent organic group having at least one selected from the group consisting of $-C_6H_4-$, $-CONR^4-$, $-CONR^4-C_6H_4-$, $-CO-$, $-CO-C_6H_4-$, $-SO_2NR^4-$, $-SO_2NR^4-C_6H_4-$, $-SO_2-$, and $-SO_2-C_6H_4-$. Such $-C_4H_4-$, $-CONR^4-$, $-CONR^4-C_6H_4-$, $-CO-$, $-CO-C_6H_4-$, $-SO_2NR^4-$, $-SO_2NR^4-C_6H_4-$, $-SO_2-$, or $-SO_2-C_4H_4-$ is preferably contained in a molecular backbone of the PFPE-containing silane compound (a).

In the formulae, α1 is an integer of 1 to 9, and may be varied depending on the valence of $X^1$. In formula (A), α1 corresponds to a value obtained by subtracting 1 from the valence of $X^1$. In the case where $X^1$ is a single bond, α1 is 1.

$X^1$ is preferably a di- to heptavalent, more preferably di- to tetravalent, further preferably divalent organic group.

In one embodiment, $X^1$ is a di- to tetravalent organic group, and α1 is 1 to 3.

In another embodiment, $X^1$ is a divalent organic group, and α1 is 1. In such a case, formula (A) is represented by the following formula (A').

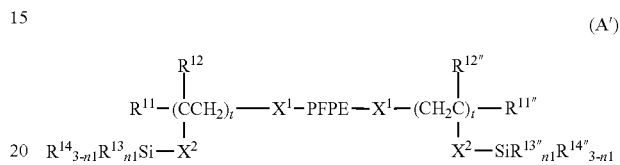

Examples of $X^1$ are not limited, and include a divalent group represented by the following formula:

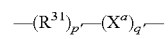

wherein:

$R^{31}$ represents a single bond, $-(CH_2)_{s'}-$, or an o-, m- or p-phenylene group, preferably represents $-(CH_2)_{s'}-$, s' is an integer of 1 to 20, preferably an integer of 1 to 6, more preferably an integer of 1 to 3, still more preferably 1 or 2, $X^a$ represents, $-(X^b)_{l'}-$, each $X^b$, at each occurrence, independently represents a group selected from the group consisting of $-O-$, $-S-$, o-, m- or p-phenylene group, $-C(O)O-$, $-Si(R^{33})_2-$, $-(Si(R^{33})_2O)_{m'}-$ $Si(R^{33})_2-$, $-CONR^{34}-$, $-O-CONR^{34}-$, $-NR^{34}-$ and $-(CH_2)_{n'}-$, each $R^{33}$, at each occurrence, independently represents a phenyl group, a $C_{1-6}$ alkyl group or a $C_{1-6}$ alkoxy group, preferably represents a phenyl group or a $C_{1-6}$ alkyl group, more preferably represents a methyl group, each $R^{34}$, at each occurrence, independently represents a hydrogen atom, a phenyl group, or a $C_{1-6}$ alkyl group (preferably a methyl group), each m', at each occurrence, is independently an integer of 1 to 100, preferably an integer of 1 to 20, each n', at each occurrence, is independently an integer of 1 to 20, preferably an integer of 1 to 6, more preferably an integer of 1 to 3, l' is an integer of 1 to 10, preferably an integer of 1 to 5, more preferably an integer of 1 to 3, p' is 0 or 1, and q' is 0 or 1, provided that at least one of p' and q' is 1, and the occurrence order of the respective repeating units in parentheses with p' or q' is not limited. Here, $R^{31}$ and $X^a$ (typically, any hydrogen atom in $R^{31}$ and $X^a$) are each optionally substituted with one or more substituents selected from a fluorine atom, a $C_{1-3}$ alkyl group and a $C_{1-3}$ fluoroalkyl group.

In one embodiment, l' is 1.

Preferably, $X^3$ is $-(R^{31})_{p'}-(X^a)_{q'}-R^{32}-$. $R^{32}$ represents a single bond, $-(CH_2)_{t'}-$, or an o-, m- or p-phenylene group, preferably $-(CH_2)_{t'}-$. Here, t' is an integer of 1 to 20, preferably an integer of 2 to 6, more preferably an integer of 2 to 3. Here, $R^{32}$ (typically, any hydrogen atom in $R^{32}$) is optionally substituted with one or more substituents selected from a fluorine atom, a $C_{1-3}$ alkyl group and a $C_{1-3}$ fluoroalkyl group.

Preferably, $X^1$ can be
a single bond,
a $C_{1-20}$ alkylene group,
—$R^{31}$—$X^c$—$R^{32}$—, or
—$X^d$—$R^{32}$—
wherein $R^{31}$ and $R^{32}$ have the same meanings as described above. Herein, such an alkylene group is a group having a —($C_\delta H_{2\delta}$)— structure, and is optionally substituted or unsubstituted and is optionally linear or branched.

More preferably, $X^1$ is
a single bond,
a $C_{1-20}$ alkylene group,
—$(CH_2)_{s'}$—$X^c$—,
—$(CH_2)_{s'}$—$X^c$—$(CH_2)_{t'}$—,
—$X^d$—, or
—$X^d$—$(CH_2)_{t'}$—
wherein s' and t' have the same meanings as described above.

Further preferably, $X^1$ is
—$X^f$—,
a —$X^f$—$C_{1-20}$ alkylene group,
—$X^f$—$(CH_2)_n$—$X^c$—,
—$X^f$—$(CH_2)_{s'}$—$X^c$—$(CH_2)_{t'}$—,
—$X^f$—$X^d$—, or
—$X^f$—$X^d$—$(CH_2)_{t'}$—
wherein s' and t' have the same meanings as described above.

In the formulae, $X^f$ is an alkylene group having 1 to 6 carbon atoms, preferably 1 to 4 carbon atoms, more preferably 1 to 2 carbon atoms, for example, a methylene group. Any hydrogen atom in $X^f$ is optionally substituted with one or more substituents selected from a fluorine atom, a $C_{1-3}$ alkyl group and a $C_{1-3}$ fluoroalkyl group, and is preferably substituted. $X^f$ may be linear or branched, and is preferably linear.

In the formulae, $X^c$ represents
—O—,
—S—,
—C(O)O—,
—CONR$^{34}$—,
—O—CONR$^{34}$—,
—Si(R$^{33}$)$_2$—,
—(Si(R$^{33}$)$_2$O)$_{m'}$—Si(R$^{33}$)$_2$—,
—O—(CH$_2$)$_{u'}$—(Si(R$^{33}$)$_2$O)$_{m'}$—Si(R$^{33}$)$_2$—,
—O—(CH$_2$)$_{u'}$—Si(R$^{33}$)$_2$—O—Si(R$^{33}$)$_2$—CH$_2$—CH$_2$—Si(R$^{33}$)$_2$—O—Si(R$^{33}$)$_2$—,
—O—(CH$_2$)$_{u'}$—Si(OCH$_3$)$_2$OSi(OCH$_3$)$_2$—,
—CONR$^{34}$—(CH$_2$)$_{u'}$—(Si(R$^{33}$)$_2$O)$_{m'}$—Si(R$^{33}$)$_2$—,
—CONR$^{34}$—(CH$_2$)$_{u'}$—N(R$^{34}$)—, or
—CONR$^{34}$-(o-, m- or p-phenylene)-Si(R$^{33}$)$_2$—
wherein $R^{33}$, $R^{34}$ and m' have the same meanings as described above, and
u' is an integer of 1 to 20, preferably an integer of 2 to 6, more preferably an integer of 2 to 3. $X^c$ is preferably —O—.

In the formulae, $X^d$ represents
—S—,
—C(O)O—,
—CONR$^{34}$—,
—CONR$^{34}$—(CH$_2$)$_{u'}$—(Si(R$^{33}$)$_2$O)$_{m'}$—Si(R$^{33}$)$_2$—,
—CONR$^{34}$—(CH$_2$)$_{u'}$—N(R$^{34}$)—, or
—CONR$^{34}$-(o-, m- or p-phenylene)-Si(R$^{33}$)$_2$—
wherein each symbol has the same meaning as described above.

Particularly preferably, $X^1$ is a group represented by
—$X^f$—,
a —$X^f$—$C_{1-20}$ alkylene group, —$X^f$—(CH$_2$)$_{s'}$—$X^c$—,
—$X^f$—(CH$_2$)$_{s'}$—$X^c$—(CH$_2$)$_{t'}$—,
—$X^f$—$X^d$—, or
—$X^f$—$X^d$—(CH$_2$)$_{t'}$—
wherein $X^f$, s' and t' have the same meanings as described above;
$X^c$ represents —O—, or —CONR$^{34}$—,
$X^d$ represents —CONR$^{34}$—, and
each $R^{34}$, at each occurrence, independently represents a hydrogen atom, a phenyl group, or a $C_{1-6}$ alkyl group (preferably a methyl group).

In one embodiment, $X^1$ is a group represented by
—$X^f$—(CH$_2$)$_{s'}$—$X^c$—,
—$X^f$—(CH$_2$)$_{s'}$—$X^c$—(CH$_2$)$_{t'}$—,
—$X^f$—$X^d$—, or
—$X^f$—$X^d$—(CH$_2$)$_{t'}$—
wherein $X^f$, s' and t' have the same meanings as described above;
$X^c$ represents —CONR$^{34}$—,
$X^d$ represents —CONR$^{34}$—, and
each $R^{34}$, at each occurrence, independently represents a hydrogen atom, a phenyl group or a $C_{1-6}$ alkyl group (preferably a methyl group).

In one embodiment, $X^1$ can be,
a single bond,
a $C_{1-20}$ alkylene group,
—(CH$_2$)$_{s'}$—$X^c$—(CH$_2$)$_{t'}$—, or
—$X^d$—(CH$_2$)$_{t'}$—
wherein each symbol has the same meaning as described above.

Preferably, $X^1$ is
a single bond,
a $C_{1-20}$ alkylene group,
—(CH$_2$)$_{s'}$—O—(CH$_2$)$_{t'}$—,
—(CH$_2$)$_{s'}$—(Si(R$^{33}$)$_2$O)$_{m'}$—Si(R$^{33}$)$_2$—(CH$_2$)$_{t'}$—,
—(CH$_2$)$_{s'}$—O—(CH$_2$)$_{u'}$—(Si(R$^{33}$)$_2$O)$_{m'}$—Si(R$^{33}$)$_2$—(CH$_2$)$_{t'}$—, or
—(CH$_2$)$_{s'}$—O—(CH$_2$)$_{t'}$—Si(R$^{33}$)$_2$—(CH$_2$)$_{u'}$—Si(R$^{33}$)$_2$—(C$_v$H$_{2v}$)—
wherein $R^{33}$, m', s', t' and u' have the same meanings as described above, and v is an integer of 1 to 20, preferably an integer of 2 to 6, more preferably an integer of 2 to 3.

In the formulae, —(C$_v$H$_{2v}$)— is optionally linear or branched, and can be, for example, —CH$_2$—, —CH$_2$CH$_2$—, —CH$_2$CH$_2$CH$_2$—, —CH(CH$_3$)— or —CH(CH$_3$)CH$_2$—.

The $X^1$ group is optionally substituted with one or more substituents selected from a fluorine atom, a $C_{1-3}$ alkyl group and a $C_{1-3}$ fluoroalkyl group (preferably $C_{1-3}$perfluoroalkyl group).

In one embodiment, the $X^1$ group can be other than a —O—$C_{1-6}$ alkylene group.

In another embodiment, examples of the $X^1$ group include the following groups:

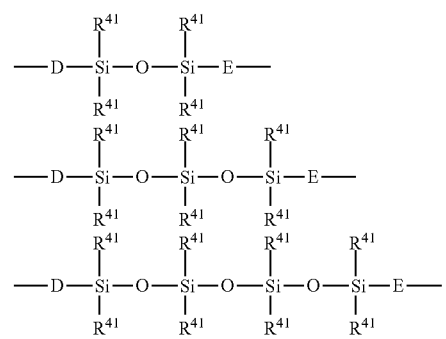

-continued

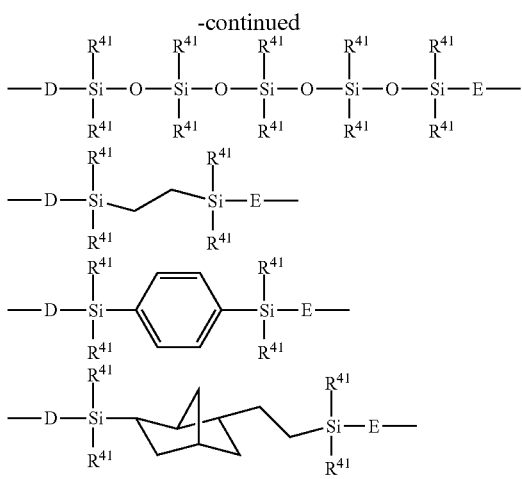

wherein each $R^{41}$ independently represents a hydrogen atom, a phenyl group, an alkyl group having 1 to 6 carbon atoms, or a $C_{1-6}$ alkoxy group, preferably a methyl group;
D is a group selected from
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—CONH—$(CH_2)_3$—,
—CON($CH_3$)—$(CH_2)_3$—,
—CON(Ph)-$(CH_2)_3$—, wherein Ph means phenyl; and

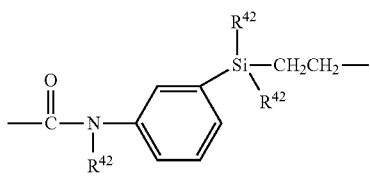

wherein each $R^{42}$ independently represents a hydrogen atom, a $C_{1-6}$ alkyl group or a $C_{1-6}$ alkoxy group, preferably a methyl group or a methoxy group, more preferably a methyl group;
E is —$(CH_2)_{ne}$— (ne is an integer of 2 to 6),
D is bonding to PFPE of a molecular backbone, and E is bonding to a group opposite to PFPE.
Specific examples of $X^1$ include:
a single bond,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$—,
—$CF_2$—$CH_2$—O—$(CH_2)_3$—,
—$CF_2$—$CH_2$—O—$(CH_2)_6$—,
—$CH_2O(CH_2)_3Si(CH_3)_2OSi(CH)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_3)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—C(O)NH—$CH_2$—,
—$CH_2OCH_2(CH_2)_vCH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—Si($CH_3$)$_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—CO—,
—CONH—,
—CONH—$CH_2$—,
—CONH—$(CH_2)_2$—,
—CONH—$(CH_2)_3$—,
—CONH—$(CH_2)_6$—,
—$CF_2$CONH—,
—$CF_2$CONH$CH_2$—,
—$CF_2$CONH$(CH_2)_2$—,
—$CF_2$CONH$(CH_2)_3$—,
—$CF_2$CONH$(CH_2)_6$—,
—CON($CH_3$)—$(CH_2)_3$—,
—CON(Ph)-$(CH_2)_3$, wherein Ph means phenyl,
—CON($CH_3$)—$(CH_2)_6$—,
—CON(Ph)-$(CH_2)_6$—, wherein Ph means phenyl,
—$CF_2$—CON($CH_3$)—$(CH_2)_3$—,
—$CF_2$—CON(Ph)-$(CH_2)_3$—, wherein Ph means phenyl,
—$CF_2$—CON($CH_3$)—$(CH_2)_6$—,
—$CF_2$—CON(Ph)-$(CH_2)_6$—, wherein Ph means phenyl,
—CONH—$(CH_2)_2$NH$(CH_2)_3$—,
—CONH—$(CH_2)_6$NH$(CH_2)_3$—,
—$CH_2$O—CONH—$(CH_2)_3$—,
—$CH_2$O—CONH—$(CH_2)_6$—,
—S—$(CH_2)_3$—,
—$(CH_2)_2$S$(CH_2)_3$—,
—CONH—$(CH_2)_3Si(CH_3)_2OSi(CH_3)_2(CH_2)_2$—,
—CONH—$(CH_2)_3Si(CH_3)_2OSi(CH_3)_2OSi(CH_3)_2(CH_2)_2$—, —CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_2$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$))$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)—, and
—OCFHCF$_2$—

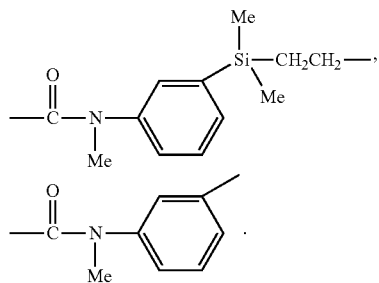

In particular, X$^1$ is preferably
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF—C(O)NH—CH$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—, or
—OCFHCF$_2$—.
In particular, X$^1$ is more preferably
—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$—CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—.

In one embodiment, X$^1$ represents X$^{e'}$. X$^{e'}$ represents a single bond, an alkylene group having 1 to 6 carbon atoms, —R$^{51}$—C$_6$H$_4$—R$^{52}$—, —R$^{51}$—CONR$^4$—R$^{52}$)—, —R$^{51}$—CONR$^4$—C$_6$H$_4$—R$^{52}$—, —R$^{51}$—CO—R$^{52}$—, —R$^{51}$—CO—C$_6$H$_4$—R$^{52}$—, —R$^{51}$—SO$_2$NR$^4$—R$^{52}$—, —R$^{51}$—SO$_2$NR$^4$—C$_6$H$_4$—R$^{52}$—, —R$^{51}$—SO$_2$—R$^{52}$—, or —R$^{51}$—SO$_2$—C$_6$H$_4$—R$^{52}$—. R$^{51}$ and R$^{52}$ each independently represent a single bond or an alkylene group having 1 to 6 carbon atoms, preferably a single bond or an alkylene group having 1 to 3 carbon atoms. R$^4$ has the same meaning as described above. The alkylene group is substituted or unsubstituted, preferably unsubstituted. Examples of the substituent of the alkylene group can include a halogen atom, preferably a fluorine atom. The alkylene group is linear or branched, preferably linear.

In a preferable embodiment, $X^{e'}$ can be
a single bond,
—$X^f$—,
an alkylene group having 1 to 6 carbon atoms, preferably 1 to 3 carbon atoms,
a —$X^f$—$C_{1-6}$ alkylene group, preferably a —$X^f$—$C_{1-3}$ alkylene group, more preferably
a —$X^f$—$C_{1-2}$ alkylene group,
—$C_6H_4$—$R^{52'}$—,
—$CONR^{4'}$—$R^{52'}$—,
—$CONR^{4'}$—$C_6H_4$—$R^{52'}$—,
—$X^f$—$CONR^{4'}$—$R^{52'}$—,
—$X^5$—$CONR^{4'}$—$C_6H_4$—$R^{52'}$—,
—$CO$—$R^{52'}$—,
—$CO$—$C_6H_4$—$R^{52'}$—,
—$SO_2NR^{4'}$—$R^{52'}$—,
—$SO_2$—$NR^{4'}$—$C_6H_4$—$R^{52'}$—,
—$SO_2$—$C_6H_4$—$R^{52'}$—,
—$R^{51'}$—$C_6H_4$—,
—$R^{51'}$—$CONR^{4'}$—,
—$R^{51'}$—$CONR^{4'}$—$C_6H_4$—,
—$R^{51'}$—$CO$—,
—$R^{51'}$—$CO$—$C_6H_4$—,
—$R^{51'}$—$SO_2NR^{4'}$—,
—$R^{51'}$—$SO_2NR^{4'}$—$C_6H_4$—,
—$R^{51'}$—$SO_2$—,
—$R^{51'}$—$SO_2$—$C_6H_4$—,
—$C_6H_4$—,
—$CONR^{4'}$—,
—$CONR^{4'}$—$C_6H_4$—,
—$X^f$—$CONR^{4'}$—,
—$X^f$—$CONR^{4'}$—$C_6H_4$—,
—$CO$—,
—$CO$—$C_6H_4$—,
—$SO_2NR^{4'}$—,
—$SO_2$—$NR^{4'}$—$C_6H_4$—
—$SO_2$—, or
—$SO_2$—$C_6H_4$—
wherein $R^{51'}$ and $R^{52'}$ each independently represent a linear alkylene group having 1 to 6 carbon atoms, preferably 1 to 3 carbon atoms, the alkylene group is substituted or unsubstituted, as described above, and examples of the substituent of the alkylene group can include a halogen atom, preferably a fluorine atom, and
$R^{4'}$ is a hydrogen atom or a methyl group.

In particular, $X^{e'}$ can be preferably
—$X^f$—,
an alkylene group having 1 to 6 carbon atoms, preferably 1 to 3 carbon atoms, or
a —$X^f$—$C_{1-6}$ alkylene group, preferably a —$X^f$—$C_{1-3}$ alkylene group, more preferably
a —$X^f$—$C_{1-2}$ alkylene group,
—$CONR^{4'}$—$R^{52'}$—,
—$CONR^{4'}$—$C_6H_4$—$R^{52'}$—,
—$X^f$—$CONR^{4'}$—$R^{52'}$—,
—$X^f$—$CONR^{4'}$—$C_6H_4$—$R^{52'}$—,
—$R^{51'}$—$CONR^{4'}$—,
—$R^{51'}$—$CONR^{4'}$—$C_6H_4$—,
—$CONR^{4'}$—,
—$CONR^{4'}$—$C_6H_4$—,
—$X^f$—$CONR^{4'}$—,
—$X^f$—$CONR^{4'}$—$C_6H_4$—,
—$R^{51'}$—$CONR^{4'}$—, or
—$R^{51'}$—$CONR^{4'}$—$C_6H_4$—. In the formulae, $X^f$, $R^{4'}$, $R^{51'}$ and $R^{52'}$ each have the same meanings as described above.

In particular, $X^{e'}$ can be more preferably
—$CONR^{4'}$—$R^{52'}$—,
—$CONR^{4'}$—$C_6H_4$—$R^{52'}$—,
—$X^f$—$CONR^{4'}$—$R^{52'}$—,
—$X^f$—$CONR^{4'}$—$C_6H_4$—$R^{52'}$—,
—$R^{51'}$—$CONR^{4'}$—,
—$R^{51'}$—$CONR^{4'}$—$C_6H_4$—,
—$CONR^{4'}$—,
—$CONR^{4'}$—$C_6H_4$—,
—$X^f$—$CONR^{4'}$—, or
—$X^f$—$CONR^{4'}$—$C_6H_4$—.

In the present embodiment, specific examples of $X^{e'}$ include
a single bond,
an alkylene group having 1 to 6 carbon atoms,
a perfluoroalkylene group having 1 to 6 carbon atoms (for example, —$CF_2$—, —$(CF_2)_2$—),
—$CF_2$—$C_{1-6}$ alkylene group,
—$CONH$—,
—$CONH$—$CH_2$—,
—$CONH$—$(CH_2)_2$—,
—$CONH$—$(CH_2)_3$—,
—$CF_2$—$CONH$—,
—$CF_2CONHCH_2$—,
—$CF_2CONH(CH_2)_2$—,
—$CF_2CONH(CH_2)_3$—,
—$CON(CH_3)$—,
—$CON(CH_3)$—$CH_2$—,
—$CON(CH_3)$—$(CH_2)_3$—,
—$CON(CH)$—$(CH_2)_3$—,
—$CF_2$—$CON(CH_3)$—,
—$CF_2$—$CON(CH_3)CH_2$—,
—$CF_2$—$CON(CH_3)$—$(CH_2)_2$—,
—$CF_2$—$CON(CH_3)$—$(CH_2)_3$—,
—$CH_2$—$CONH$—,
—$CH_2$—$CONH$—$CH_2$—,
—$CH_2$—$CONH$—$(CH_2)_2$—,
—$CH_2$—$CONH$—$(CH_2)_3$—,
—$CF_2$—$CH_2$—$CONH$—,
—$CF_2$—$CH_2$—$CONH$—$CH_2$—,
—$CF_2$—$CH_2$—$CONH$—$(CH_2)_2$—,
—$CF_2$—$CH_2$—$CONH$—$(CH_2)_3$—,
—$CONH$—$C_6H_4$—,
—$CON(CH_3)$—$C_6H_4$—,
—$CH_2$—$CON(CH_3)$—$CH_2$—,
—$CH_2$—$CON(CH_3)$—$(CH_2)$—,
—$CH_2$—$CON(CH_3)$—$(CH_2)_3$—,
—$CON(CH_3)$—$C_6H_4$—,
—$CF_2$—$CONH$—$C_6H_4$—,
—$CF_2$—$CON(CH_3)$—$C_6H_4$—,
—$CF_2$—$CH_2$—$CON(CH_3)$—$CH_2$—,
—$CF_2$—$CH_2$—$CON(CH_3)$—$(CH_2)_2$—,
—$CF_2$—$CH_2$—$CON(CH_3)$—$(CH_2)_3$—,
—$CF_2$—$CON(CH_3)$—$C_6H_4$—,
—$CO$—,
—$CO$—$C_6H_4$—,
—$C_6H_4$—,
—$SO_2NH$—,
—$SO_2NH$—$CH_2$—,
—$SO_2NH$—$(CH_2)_2$—,
—$SO_2NH$—$(CH_2)$—,
—$SO_2NH$—$C_6H_4$—,
—$SO_2N(CH_3)$—,
—$SO_2N(CH_3)$—$CH_2$—,
—$SO_2$—$N(CH_3)$—$(CH_2)_2$—, —SO$_2$N(CH$_3$)—(CH$_2$)$_3$—,
—SO$_2$N(CH$_3$)—C$_6$H$_4$—,
—SO$_2$—,
—SO$_2$—CH$_2$—,
—SO$_2$—(CH$_2$)$_2$—,
—SO$_2$—(CH$_2$)—, or
—SO$_2$—C$_6$H$_4$—.

In the above list, examples of preferable $X^{e'}$ include an alkylene group having 1 to 6 carbon atoms, a perfluoroalkylene group having 1 to 6 carbon atoms (for example, —CF$_2$— and —(CF$_2$)$_2$—),
a —CF$_2$—C$_{1-6}$ alkylene group,
—CONH—,
—CONH—CH$_2$—,
—CONH—(CH$_2$)$_2$—,
—CONH—(CH$_2$)$_3$—,
—CF$_2$CONH—,
—CF$_2$CONHCH$_2$—,
—CF$_2$CONH(CH$_2$)$_2$—,
—CF$_2$CONH(CH$_3$)—,
—CON(CH$_3$)—,
—CON(CH$_3$)—CH$_2$—,
—CON(CH$_3$)—(CH$_2$)$_2$—,
—CON(CH$_3$)—(CH$_2$)$_3$—,
—CF$_2$—CON(CH$_3$)—,
—CF$_2$—CON(CH$_3$)CH$_2$—,
—CF$_2$—CON(CH$_3$)—(CH$_2$)$_2$—,
—CF$_2$—CON(CH$_3$)—(CH$_2$)$_3$—,
—CH$_2$—CONH—,
—CH$_2$—CONH—CH$_2$—,
—CH$_2$—CONH—(CH$_2$)$_2$—,
—CH$_2$—CONH—(CH$_2$)$_3$—,
—CF$_2$—CH$_2$—CONH—,
—CF$_2$—CH$_2$—CONH—CH$_2$—,
—CF$_2$—CH$_2$—CONH—(CH$_2$)$_2$—,
—CF$_2$—CH$_2$—CONH—(CH$_2$)$_3$—,
—CONH—C$_6$H$_4$—,
—CON(CH$_3$)—C$_6$H$_4$—,
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CON(CH$_3$)—C$_6$H$_4$—
—CF$_2$—CONH—C$_6$H$_4$—,
—CF$_2$—CON(CH$_3$)—C$_6$H$_4$—,
—CF$_2$—CH$_2$—CON(CH$_3$)—CH$_2$—,
—CF$_2$—CH$_2$—CON(CH$_3$)—(CH$_2$)$_2$—,
—CF$_2$—CH$_2$—CON(CH$_3$)—(CH$_2$)$_3$—, and
—CF$_2$—CON(CH$_4$)—C$_6$H$_4$—.

In the above list, examples of more preferable $X^{e'}$ include
—CONH—,
—CONH—CH$_2$—,
—CONH—(CH$_2$)$_2$—,
—CONH—(CH$_2$)$_3$—,
—CF$_2$CONH—,
—CF$_2$CONHCH$_2$—,
—CF$_2$CONH(CH$_2$)$_2$—,
—CF$_2$CONH(CH$_2$)$_3$—,
—CON(CH$_3$)—,
—CON(CH$_3$)—CH$_2$—,
—CON(CH$_3$)—(CH$_2$)$_2$—,
—CON(CH$_3$)—(CH$_2$)$_3$—,
—CF$_2$—CON(CH$_3$)—,
—CF$_2$—CON(CH$_3$)CH$_2$—,
—CF$_2$—CON(CH$_3$)—(CH$_2$)$_2$—,
—CF$_2$—CON(CH$_3$)—(CH$_2$)$_3$—,
—CH$_2$—CONH—,
—CH$_2$—CONH—CH$_2$—,
—CH$_2$—CONH—(CH$_2$)$_2$—,
—CH$_2$—CONH—(CH$_2$)$_3$—,
—CF$_2$—CH$_2$—CONH—,
—CF$_2$—CH$_2$—CONH—CH$_2$—,
—CF$_2$—CH$_2$—CONH—(CH)$_2$—,
—CF$_2$—CH$_2$—CONH—(CH$_2$)$_3$—,
—CONH—C$_6$H$_4$—,
—CON(CH$_3$)—C$_6$H$_4$—,
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CON(CH)—C$_6$H$_4$—
—CF$_2$—CONH—C$_6$H$_4$—,
—CF$_2$—CON(CH$_3$)—C$_6$H$_4$—,
—CF$_2$—CH$_2$—CON(CH$_3$)—CH$_2$—,
—CF$_2$—CH$_2$—CON(CH$_3$)—(CH$_2$)$_2$—,
—CF$_2$—CH$_2$—CON(CH)—(CH$_2$)$_3$—, or
—CF$_2$—CON(CH$_3$)—C$_6$H$_4$—.

In one embodiment, $X^{e'}$ is a single bond. In the present embodiment, PFPE and a group having a binding ability to the base material (namely, group in parentheses with α1 in (A)) are directly bonded.

In still another embodiment, $X^1$ is a group represented by formula: —(R$^{16}$)$_x$—(CFR$^{17}$)$_y$—(CH$_2$)$_z$—. In the formula, x, y and z are each independently an integer of 0 to 10, the sum of x, y and z is 1 or more, and the occurrence order of the respective repeating units in parentheses is not limited in the formula.

In the formula, each R$^{16}$, at each occurrence, independently represents an oxygen atom, phenylene, carbazolylene, —NR$^{18}$—, wherein R$^{18}$ represents a hydrogen atom or an organic group, or a divalent organic group. Preferably, R$^{16}$ is an oxygen atom or a divalent polar group.

The "divalent polar group" is not limited, and examples thereof include —C(O)—, —C(=NR$^{19}$)—, and —C(O)NR$^9$—, wherein R$^{19}$ represents a hydrogen atom or a lower alkyl group. The "lower alkyl group" is, for example, an alkyl group having 1 to 6 carbon atoms, such as a methyl group, an ethyl group, or a n-propyl group, and such a group is optionally substituted with one or more fluorine atoms.

In the formula, each R$^{17}$, at each occurrence, is independently a hydrogen atom, a fluorine atom or a lower fluoroalkyl group, preferably a fluorine atom. The "lower fluoroalkyl group" is, for example, a fluoroalkyl group having 1 to 6 carbon atoms, preferably 1 to 3 carbon atoms, preferably a perfluoroalkyl group having 1 to 3 carbon atoms, more preferably a trifluoromethyl group or a pentafluoroethyl group, further preferably a trifluoromethyl group.

In this embodiment, $X^1$ is preferably a group represented by formula: —(O)$_x$—(CF$_2$)$_y$—(CH$_2$)$_z$—, wherein x, y and z have the same meanings as described above, and the occurrence order of the respective repeating units in parentheses is not limited in the formula.

Examples of the group represented by formula: —(O)$_x$—(CF$_2$)$_y$—(CH$_2$)$_z$— include any group represented by —(O)$_{x'}$—(CH$_2$)$_{z''}$—O—[(CH$_2$)$_{z'''}$—O—]$_{z''''}$, and —(O)$_{x'}$—(CF$_2$)$_{y''}$—(CH$_2$)$_{z''}$—O—[(CH$_2$)$_{z'''}$—O—]$_{z''''}$, wherein x' is 0 or 1, y'', z'' and z''' are each independently an integer of 1 to 10, and z'''' is 0 or 1. Herein, a left end of such a group is bonding to PFPE.

In another preferable embodiment, $X^1$ is —O—CFR$^{20}$—(CF$_2$)$_e$—.

Each R$^{20}$ independently represents a fluorine atom or a lower fluoroalkyl group. The lower fluoroalkyl group is, for example, a fluoroalkyl group having 1 to 3 carbon atoms, preferably a perfluoroalkyl group having 1 to 3 carbon atoms, more preferably a trifluoromethyl group or a pentafluoroethyl group, further preferably a trifluoromethyl group.

Each e' is independently 0 or 1.

In one specific example, $R^{20}$ is a fluorine atom and e' is 1.

In still another embodiment, examples of the $X^1$ group include the following groups:

wherein
each $R^{41}$ independently represents a hydrogen atom, a phenyl group, an alkyl group having 1 to 6 carbon atoms, or a $C_{1-6}$ alkoxy group, preferably a methyl group;
any number of the Ts in each $X^1$ group is the following group bonding to PFPE of a molecular backbone:
—$CH_2O(CH_2)_2$—,
—$CH_2O(CH_2)_3$—,
—$CF_2O(CH_2)_3$—,
—$CH_2$—,
—$(CH_2)_2$—,
—$(CH_2)_3$—,
—$(CH_2)_4$—,
—CONH—$(CH_2)_3$—,
—CON($CH_3$)—$(CH_2)_3$—,
—CON(Ph)-$(CH_2)_3$—, wherein Ph means phenyl, or wherein each $R^{42}$ independently represents a hydrogen atom, a $C_{1-6}$ alkyl group or a $C_{1-6}$ alkoxy group, preferably a methyl group or a methoxy group, more preferably a methyl group, some other of the Ts is —$(CH_2)_{n''}$— (n'' is an integer of 2 to 6) bonding to a group opposite to PFPE of a molecular backbone, and the remaining T, if present, can be independently a methyl group, a phenyl group, a $C_{1-6}$ alkoxy group, or a radical scavenging group or an UV absorbing group. Also in the embodiment, a left portion and a right portion of the group designated as $X^1$ are bonding to the group represented by $PFPE^1$ and the group in parentheses with α1, respectively.

The radical scavenging group is not limited as long as it can scavenge a radial generated by light irradiation, and examples thereof include a residue of benzophenones, benzotriazoles, benzoates, phenyl salicylates, crotonic acids, malonates, organoacrylates, hindered amines, hindered phenols, or triazines.

The UV absorbing group is not limited as long as it can absorb ultraviolet light, and examples thereof include a residue of benzotriazoles, hydroxybenzophenones, esters of substituted and unsubstituted benzoic acid or salicylic acid compounds, acrylates or alkoxy cinnamates, oxamides, oxanilides, benzoxazinones, and benzoxazoles.

In a preferable embodiment, examples of a preferable radical scavenging group or an UV absorbing group include

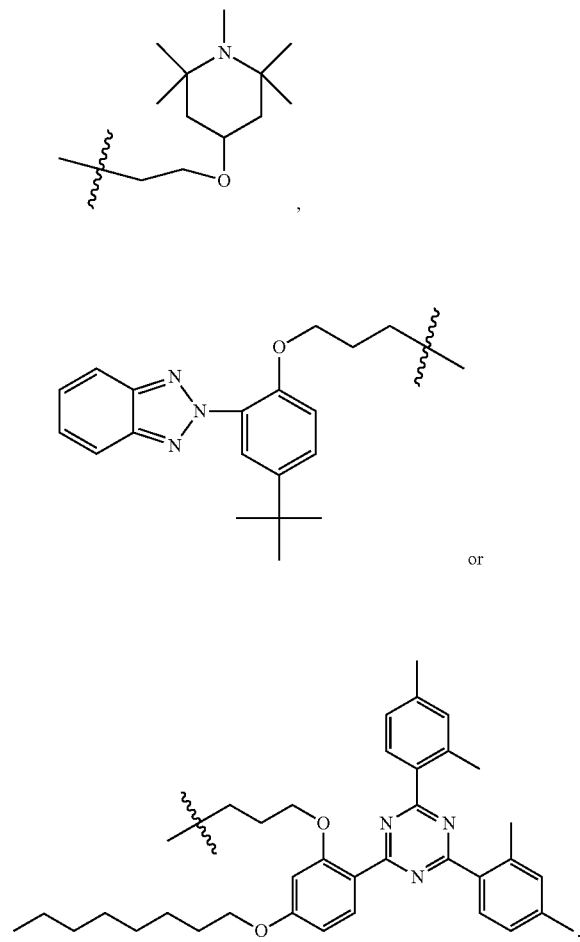

In this embodiment, $X^1$ (and, the following $X^3$, $X^5$ and $X^7$) can be a tri- to decavalent organic group.

In the formulae, each $X^2$, at each occurrence, independently represents a single bond or a divalent organic group. $X^2$ is preferably an alkylene group having 1 to 20 carbon atoms, more preferably —(CH$_2$)$_u$—, wherein u is an integer of 0 to 2.

In the formulae, each t is independently an integer of 1 to 10. In a preferable embodiment, t is an integer of 1 to 6. In another preferable embodiment, t is an integer of 2 to 10, preferably an integer of 2 to 6.

A preferable compound represented by formula (A) is a compound represented by the following formula (A'):

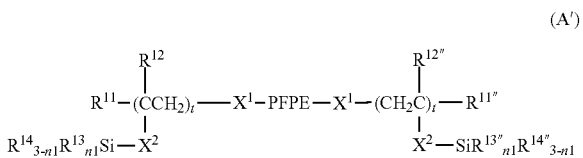

wherein:
each PFPE$^1$ is independently a group represented by formula:

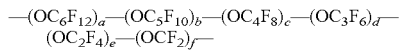

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, and the ratio of e to f is 1.0 or more;
each $R^{13}$, at each occurrence, independently represents a hydroxyl group or a hydrolyzable group;
each $R^{14}$, at each occurrence, independently represents a hydrogen atom or an alkyl group having 1 to 22 carbon atoms;
each $R^{11}$, at each occurrence, independently represents a hydrogen atom or a halogen atom;
each $R^{12}$, at each occurrence, independently represents a hydrogen atom or a lower alkyl group;
$R^{11"}$, $R^{12"}$, $R^{13"}$ and $R^{14"}$ have the same meanings as $R^{11}$, $R^{12}$, $R^{13}$ and $R^{14}$, respectively;
n1 is an integer of 1 to 3, preferably 3;
each $X^1$, at each occurrence, is independently —O—CFR$^{20}$—(CF$_2$)$_{e'}$—;
each $R^{20}$, at each occurrence, is independently a fluorine atom or a lower fluoroalkyl group;
each e', at each occurrence, is independently 0 or 1;
X, is —(CH$_2$)$_u$—;
each u, at each occurrence, is independently an integer of 0 to 2; and
each t, at each occurrence, is independently an integer of 2 to 10.

Such any compound represented by formula (A) can be obtained by, for example, using a perfluoro(poly)ether derivative corresponding to a -PFPE$^1$-moiety, as a raw material, introducing iodine into an end of thereof, and reacting a vinyl monomer corresponding to —CH$_2$CR$^{12}$ (X$^2$—SiR$^{13}{}_{n1}$R$^{14}{}_{3-n1}$)—.

Formula (B):

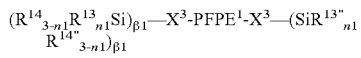

In formula (B), PFPE$^1$, $R^{13}$, $R^{13"}$, $R^{14}$, $R^{14"}$ and n1 have the same meanings as described with respect to the formula (A).

In formula (B), such a Si atom bonding to at least one group selected from the group consisting of a hydroxyl group and a hydrolyzable group indicates a Si atom contained in (SiR$^{13}{}_{n1}$R$^{14}{}_{3-n-1}$) or (—SiR$^{13"}{}_{n1}$R$^{14"}{}_{3-n1}$) where n1 is an integer of 1 to 3.

In the formulae, n1 with respect to each (—SiR$^{13}{}_{n1}$R$^{14}{}_{3-n1}$) unit or each (—SiR$^{13"}{}_{n1}$R$^{14"}{}_{3-n1}$) unit is independently an integer of 0 to 3, preferably 1 to 3, more preferably 3. In the formulae, at least two n1(s) are each an integer of 1 to 3, namely, there is not any case where all n1(s) are simultaneously 0. That is, at least two of $R^{13}$ and $R^{13''}$ are present in the formulae. That is, at least two structures selected from the group consisting of a —$SiR^{13}{}_{n1}R^{14}{}_{3-n1}$ structure (namely, —$SiR^{13}$ moiety) where n1 is 1 or more and a —$SiR^{13''}{}_{n1}R^{14''}{}_{3-n1}$ structure (namely, —$SiR^{13''}$ moiety) where n1 is 1 or more are present in formula (B).

More preferably, at least one Si bonding to the hydroxyl group or the hydrolyzable group is present at each of both ends of a molecular backbone of the PFPE-containing silane compound (a), in formula (B). That is, at least one —$SiR^{13}$ moiety is present, and at least one —$SiR^{13''}$ moiety is present.

In the formulae, each $X^3$ independently represents a single bond or a di- to decavalent organic group. $X^3$ is understood to be a linker which links a perfluoro(poly)ether moiety (namely, -$PFPE^1$-moiety) mainly providing water-repellency, surface lubricity, and the like, and a silane moiety (specifically, —$SiR^{13}{}_{n1}R^{14}{}_{3-n1}$ or —$SiR^{13''}{}_{n1}R^{14''}{}_{3-n1}$) providing a binding ability to the base material, in any compound represented by formula (B). Accordingly, $X^3$ may be a single bond or any organic group as long as such any compound represented by formula (B) can be stably present. Herein, a left portion and a right portion of the structure designated as $X^3$ are bonding to the group represented by $PFPE^1$ and the group in parentheses with β1, respectively.

In another embodiment, $X^3$ represents $X^e$. $X^e$ has the same meaning as described above.

In the formulae, β1 is an integer of 1 to 9, and may be varied depending on the valence of $X^3$. In formula (B), β1 corresponds to a value obtained by subtracting 1 from the value of the valence of $X^3$. In the case where $X^3$ is a single bond, β1 is 1.

$X^3$ is preferably a di- to heptavalent, more preferably di- to tetravalent, further preferably divalent organic group.

In one embodiment, $X^3$ is a di- to tetravalent organic group, and β1 is 1 to 3.

In another embodiment, $X^3$ is a divalent organic group, and β1 is 1. In such a case, formula (B) is represented by the following formula (B').

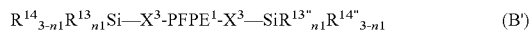
$$R^{14}{}_{3-n1}R^{13}{}_{n1}Si\text{—}X^3\text{-}PFPE^1\text{-}X^3\text{—}SiR^{13''}{}_{n1}R^{14''}{}_{3-n1} \quad (B')$$

Examples of $X^3$ are not limited, and include the same as described with respect to $X^1$.

In particular, preferable specific examples of $X^3$ include a single bond,
—$CH_2OCH_2$—,
—$CH_2O(CH_2)_2$—,
—$CH_2O(CH_2)_3$—,
—$CH_2O(CH_2)_6$—
—$CF_2$—$CH_2$—$O$—$CH_2$—,
—$CF_2$—$CH_2$—$O$—$(CH_2)_2$—,
—$CF_2$—$CH_2$—$O$—$(CH_2)_3$—,
—$CF_2$—$CH_2$—$O$—$(CH_2)_6$—,
—$CH_2O(CH_2)_3Si(CH_3)_2OSi(CH_3)_2(CH_2)_2$—,
—$CH_2O(CH_2)_3Si(CH_3))_2OSi(CH_3)_2OSi(CH_3)_2(CH_2)_2$—,
—$CH_2O(CH_2)$—$Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCF_2CHFOCF_2CF_2CF_2$—$C(O)NH$—$CH_2$—,
—$CH_2OCH(CH_2)_7$—$CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—$Si(CH_3)_2$—$(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—,
—$CF_2$—$(CH_2)_6$—,
—$CO$—,
—$CONH$—,
—$CONH$—$CH_2$—,
—$CONH$—$(CH_2)_2$—,
—$CONH$—$(CH_2)_3$—,
—$CONH$—$(CH_2)_6$—,
—$CF_2CONH$—,
—$CF_2CONHCH_2$—,
—$CF_2CONH(CH_2)_2$—,
—$CF_2CONH(CH_2)_3$—,
—$CF_2CONH(CH_2)_6$—,
—$CON(CH_3)$—$(CH_2)_3$—,
—$CON(Ph)$-$(CH_2)_3$—, wherein Ph means phenyl,
—$CON(CH_3)$—$(CH_2)_6$—,
—$CON(Ph)$-$(CH_2)_6$—, wherein Ph means phenyl,
—$CF_2$—$CON(CH_3)$—$(CH_2)_3$—,
—$CF_2$—$CON(Ph)$-$(CH_2)_3$—, wherein Ph means phenyl,
—$CF_2$—$CON(CH_3)$—$(CH_2)_6$—,
—$CF_2$—$CON(Ph)$-$(CH_2)_6$—, wherein Ph means phenyl,
—$CONH$—$(CH_2)_2NH(CH_2)_3$—,
—$CONH$—$(CH_2)_6NH(CH_2)_3$—,
—$CH_2O$—$CONH$—$(CH_2)_3$—,
—$CH_2O$—$CONH$—$(CH_2)_6$—,
—$S$—$(CH_2)_3$—,
—$(CH_2)_2S(CH_2)_3$—,
—$CONH$—$(CH_2)_3Si(CH_3)_2OSi(CH_3)_2(CH_2)_2$—,
—$CONH$—$(CH_2)_3Si(CH_3)_2OSi(CH_3)_2OSi(CH_3)_2(CH_2)_2$—,
—$CONH$—$(CH_2)_3Si(CH_3)_2O(Si(CH_3)_2O)_2Si(CH_3)_2(CH_2)_2$—,
—$CONH$—$(CH_2)_3Si(CH_3)_2O(Si(CH_3)_2O)_3Si(CH_3)_2(CH_2)_2$—, —CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)—(CH$_2$)$_2$—,
—CH$_2$—O—(CH$_2$)$_3$—Si(CH$_3$)$_2$(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

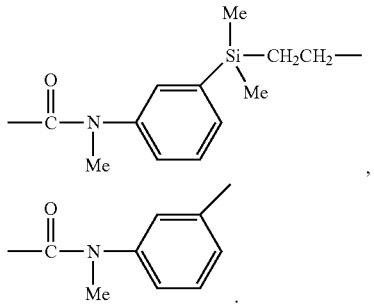

In particular, $X^3$ is preferably
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CF$_2$—,
—(CF$_2$)$_2$—,
—CF$_2$—CH$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_6$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—,
—OCFHCF$_2$—.

In particular, $X^3$ is more preferably
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_6$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—.

In another preferable embodiment, $X^3$ represents $X^{e'}$. $X^{e'}$ has the same meaning as described above.

In one embodiment, $X^{e'}$ is a single bond. In the present embodiment, PFPE$^1$ and a group having a binding ability to the base material (namely, group in parentheses with β1 in (B)) are directly bonded.

In one embodiment, at least two Si each bonding to the hydroxyl group or the hydrolyzable group are present in formula (B). That is, at least two —SiR$^{13}$ moieties are present in formula (B).

A preferable compound represented by formula (B) is a compound represented by the following formula (B'):

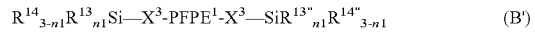

(B')

wherein:

each PFPE$^1$ is independently a group represented by formula:

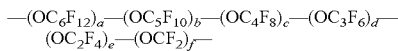
—(OC$_6$F$_{12}$)$_a$—(OC$_5$F$_{10}$)$_b$—(OC$_4$F$_8$)$_c$—(OC$_3$F$_6$)$_d$—(OC$_2$F$_4$)$_e$—(OCF$_2$)$_f$— wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, and the ratio of e to f is 1.0 or more;

each R$^{13}$, at each occurrence, independently represents a hydroxyl group or a hydrolyzable group;

each R$^{14}$, at each occurrence, independently represents a hydrogen atom or an alkyl group having 1 to 22 carbon atoms;

R$^{13''}$ and R$^{14''}$ have the same meaning as R$^{13}$ and R$^{14}$, respectively;

n1 is an integer of 1 to 3, preferably 3; and

X$^3$ is —CH$_2$O(CH$_2$)$_2$—, —CH$_2$O(CH$_2$)$_3$— or —CH$_2$O(CH$_2$)$_6$—.

Such any compound represented by formula (B) can be produced by a known method, for example, a method described in JP 2013-117012 A, or an improved method thereof.

Formula (C):

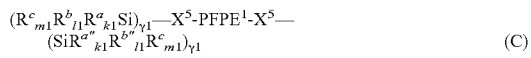
(R$^c_{m1}$R$^b_{l1}$R$^a_{k1}$Si)$_{\gamma 1}$—X$^5$-PFPE$^1$-X$^5$—(SiR$^{a''}_{k1}$R$^{b''}_{l1}$R$^{c''}_{m1}$)$_{\gamma 1}$     (C)

In formula (C), PFPE$^1$ has the same meaning as described with respect to formula (A).

In the formula, each X$^5$ independently represents a single bond or a di- to decavalent organic group. X$^5$ is understood to be a linker which links a perfluoro(poly)ether moiety (namely, -PFPE$^1$-moiety) mainly providing water-repellency, surface lubricity, and the like, and a silane moiety (specifically, —SiR$^a_{k1}$R$^b_{l1}$R$^c_{m1}$ group or —SiR$^{a''}_{k1}$R$^{b''}_{l1}$R$^{c''}_{m1}$ group) providing a binding ability to the base material, in any compound represented by formula (C). Accordingly, X$^5$ may be a single bond or any organic group as long as such any compound represented by formula (C) can be stably present. Herein, a left portion and a right portion of the structure designated as X$^5$ are bonding to the group represented by PFPE$^1$ and the group in parentheses with γ1, respectively.

In another embodiment, X$^5$ represents X$^e$. X$^e$ has the same meaning as described above.

In the formula, γ1 is an integer of 1 to 9, and γ1 may be varied depending on the valence of X$^5$. In formula (C), γ1 corresponds to a value obtained by subtracting 1 from the value of the valence of X$^5$. In the case where X$^5$ is a single bond, γ1 is 1.

X$^5$ is preferably a di- to heptavalent, more preferably di- to tetravalent, further preferably divalent organic group.

In one embodiment, X$^5$ is a di- to tetravalent organic group, and γ1 is 1 to 3.

In another embodiment, X$^5$ is a divalent organic group, and γ1 is 1. In such a case, formula (C) is represented by the following formula (C').

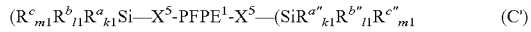
(R$^c_{m1}$R$^b_{l1}$R$^a_{k1}$Si—X$^5$-PFPE$^1$-X$^5$—(SiR$^{a''}_{k1}$R$^{b''}_{l1}$R$^{c''}_{m1}$     (C')

Examples of X$^5$ are not limited, and include the same as described with respect to X$^1$.

In particular, preferable specific examples of X$^5$ include a single bond,

—CH$_2$OCH$_2$—,
—CHO(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCF$_2$CHFOCF$_2$CF$_2$CF$_2$—C(O)NH—CH$_2$—,
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—Si(CH$_3$)$_2$—(CH$_2$)$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$,
—CO—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl, —CON(CH₃)—(CH₂)₆—,
—CON(Ph)-(CH₂)₆—, wherein Ph means phenyl,
—CF₂—CON(CH₃)—(CH₂)₃—,
—CF₂—CON(Ph)-(CH₂)₃—, wherein Ph means phenyl,
—CF₂—CON(CH₃)—(CH₂)₆—,
—CF₂—CON(Ph)-(CH₂)₆—, wherein Ph means phenyl,
—CONH—(CH₂)₂NH(CH₂)₃—,
—CONH—(CH₂)₆NH(CH₂)₃—,
—CH₂O—CONH—(CH₂)₃—,
—CH₂O—CONH—(CH₂)₆—,
—S—(CH₂)₃—,
(CH₂)₂S(CH₂)₃—,
—CONH—(CH₂)₃Si(CH₃)₂OSi(CH₃)₂(CH₂)₂—,
—CONH—(CH₂)₃Si(CH₃)₂OSi(CH₃)₂OSi(CH₃)₂(CH₂)₂—,
—CONH—(CH₂)₃Si(CH₃)₂O(Si(CH₃)₂O)₂Si(CH₃)₂(CH₂)₂—,
—CONH—(CH₂)₃Si(CH₃)₂O(Si(CH₃)₂O)₃Si(CH₃)₂(CH₂)₂—,
—CONH—(CH₂)₃Si(CH₃)₂O(Si(CH₃)₂O)₁₀Si(CH₃)₂(CH₂)₂—,
—CONH—(CH₂)₃Si(CH₃)₂O(Si(CH₃)₂O)₂₀Si(CH₃)₂(CH₂)₂—,
—C(O)O—(CH₂)₃—,
—C(O)O—(CH₂)₆—,
—CH₂—O—(CH₂)₃—Si(CH₃)₂—(CH₂)₂—Si(CH₃)₂—(CH₂)₂—,
—CH₂—O—(CH₂)₃—Si(CH₃)₂—(CH₂)₂—Si(CH₃)₂—CH(CH₃)—,
—CH₂—O—(CH₂)₃—Si(CH₃)₂—(CH₂)₂—Si(CH₃)₂—(CH₂)₃—,
—CH₂—O—(CH₂)₃—Si(CH₃)₂—(CH₂)₂—Si(CH₃)₂—CH(CH₃)—CH₂—,
—OCH₂—,
—O(CH₂)₃—, and
—OCFHCF₂—

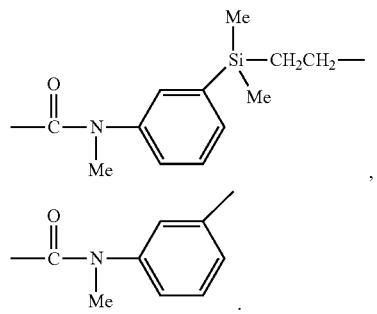

In particular, $X^5$ is preferably
—CH₂OCH₂—,
—CH₂O(CH₂)₂—,
—CH₂O(CH₂)₃—,
—CH₂O(CH₂)₆—,
—CF₂—CH₂—O—CH₂—,
—CF₂—CH₂—O—(CH₂)₂—,
—CF₂—CH₂—O—(CH₂)₃—,
—CF₂—CH₂—O—(CH₂)₆—,
—CH₂OCF₂CHFOCF₂—,
—CH₂OCF₂CHFOCF₂CF₂—,
—CH₂OCF₂CHFOCF₂CF₂CF₂—,
—CH₂OCH₂CF₂OCF₂—,
—CH₂OCH₂CF₂CF₂OCF₂CF₂—,
—CH₂OCH₂CF₂CF₂OCF₂CF₂CF₂—,
—CH₂OCH₂CF₂CF₂OCF(CF₃)CF₂OCF₂—,
—CH₂OCH₂CF₂CF₂OCF(CF₃)CF₂OCF₂CF₂—,
—CH₂OCH₂CF₂CF₂OCF(CF₃)CF₂OCF₂CF₂CF₂—,
—CH₂OCH₂CHFCF₂OCF₂—,
—CH₂OCH₂CHFCF₂OCF₂CF₂—,
—CH₂OCH₂CHFCF₂OCF₂CF₂CF₂—,
—CH₂OCH₂CHFCF₂OCF(CF₃)CF₂OCF₂—,
—CH₂OCH₂CHFCF₂OCF(CF₃)CF₂OCF₂CF₂—,
—CH₂OCH₂CHFCF₂OCF(CF₃)CF₂OCF₂CF₂CF₂—,
—CH₂OCF₂CHFOCF₂CF₂CF₂—C(O)NH—CH₂—,
—CF₂—CH₂OCF₂CHFOCF₂CF₂CF₂—C(O)NH—CH₂—,
—CH₂—,
—(CH₂)₂—,
—(CH₂)₃—,
—(CH₂)₄—,
—(CH₂)₅—,
—(CH₂)₆—
—CF₂—,
—(CF₂)₂—,
—CF₂—CH₂—,
—CF₂—(CH₂)₂—,
—CF₂—(CH₂)₃—,
—CF₂—(CH₂)₄—,
—CF₂—(CH₂)₅—,
—CF₂—(CH₂)₆—,
—CONH—,
—CONH—CH₂—,
—CONH—(CH₂)₂—,
—CONH—(CH₂)₃—,
—CONH—(CH₂)₆—,
—CF₂CONH—,
—CF₂CONHCH₂—,
—CF₂CONH(CH₂)₂—,
—CF₂CONH(CH₂)₃—,
—CF₂CONH(CH₂)₆—,
—CON(CH₂)—(CH₂)₃—,
—CON(Ph)-(CH₂)₃—, wherein Ph means phenyl,
—CON(CH₃)—(CH₂)₆—,
—CON(Ph)-(CH₂)₆—, wherein Ph means phenyl,
—CF₂—CON(CH₃)—(CH₂)₃—,
—CF₂—CON(Ph)-(CH₂)₃—, wherein Ph means phenyl,
—CF₂—CON(CH₃)—(CH₂)₆—,
—CF₂—CON(Ph)-(CH₂)₆—, wherein Ph means phenyl,
—CONH—(CH₂)₂NH(CH₂)₃—,
—CONH—(CH₂)₆NH(CH₂)₃—,
—CH₂O—CONH—(CH₂)₃—,
—CH₂O—CONH—(CH₂)₆—,
—OCH₂—,
—O(CH₂)₃—,
—OCFHCF₂—.
In particular, $X^5$ is more preferably
—CH₂OCF₂CHFOCF₂CF₂CF₂—C(O)NH—CH₂—,
—CF₂—CH₂OCF₂CHFOCF₂CF₂CF₂—C(O)NH—CH₂—,
—CONH—,
—CONH—CH₂—,
—CONH—(CH₂)₂—,
—CONH—(CH₂)₃—,
—CONH—(CH₂)₆—,
—CF₂CONH—,
—CF₂CONHCH₂—,
—CF₂CONH(CH₂)₂—,
—CF₂CONH(CH₂)₃—,
—CF₂CONH(CH₂)₆—,
—CON(CH₃)—(CH₂)₃—,
—CON(Ph)-(CH₂)₃—, wherein Ph means phenyl,
—CON(CH₃)—(CH₂)₆—,
—CON(Ph)-(CH₂)₆—, wherein Ph means phenyl, —$CF_2$—$CON(CH_3)$—$(CH_2)_3$—,
—$CF_2$—$CON(Ph)$-$(CH_2)_3$—, wherein Ph means phenyl,
—$CF_2$—$CON(CH_3)$—$(CH_2)_6$—,
—$CF_2$—$CON(Ph)$-$(CH_2)_6$—, wherein Ph means phenyl,
—$CONH$—$(CH_2)_2NH(CH_2)_3$—,
—$CONH$—$(CH_2)_6NH(CH_2)_3$—.

In another preferable embodiment, $X^5$ represents $X^{e'}$. $X^{e'}$ has the same meaning as described above.

In one embodiment, $X^{e'}$ is a single bond. In the present embodiment, $PFPE^1$ and a group having a binding ability to the base material (namely, group in parentheses with γ1 in formula (C)) are directly bonded.

In the formula, each $R^a$, at each occurrence, independently represents —$Z^3$—$SiR^{71}_{p1}R^{72}_{q1}R^{73}_{k1}$.

In the formula, each $Z^3$, at each occurrence, independently represents an oxygen atom or a divalent organic group.

$Z^3$ is preferably a divalent organic group, and does not encompass any group which is taken together with a Si atom at an end of a molecular backbone in formula (C) (Si atom to which $R^a$ is bonded) to form a siloxane bond.

$Z^3$ is preferably a $C_{1-6}$ alkylene group, —$(CH_2)_g$—O—$(CH_2)_h$—, wherein g is an integer of 1 to 6, h is an integer of 1 to 6), or -phenylene-$(CH_2)_i$—, wherein i is an integer of 0 to 6), more preferably a $C_{1-3}$ alkylene group. Such a group is optionally substituted with one or more substituents selected from, for example, a fluorine atom, a $C_{1-6}$ alkyl group, a $C_{2-6}$ alkenyl group and a $C_{2-6}$ alkynyl group. $Z^3$ is more preferably a linear or branched alkylene group, further preferably a linear alkylene group from the viewpoint of particularly favorable ultraviolet durability. The number of carbon atoms constituting the alkylene group of $Z^3$ is preferably in the range from 1 to 6, more preferably in the range from 1 to 3. The alkylene group is as described above.

In the formulae, each $R^{71}$, at each occurrence, independently represents $R^{a'}$. $R^{a'}$ has the same meaning as $R^a$.

The number of Si linearly linked via a $Z^3$ group is at most 5 in $R^a$. That is, in the case where at least one $R^{71}$ is present in $R^a$, two or more Si atoms linearly linked via a $Z^3$ group are present in $R^a$, and the number of such Si atoms linearly linked via a $Z^3$ group is at most 5. Herein, the "number of Si atoms linearly linked via a $Z^3$ group in $R^{a''}$" is equal to the number of repeatings of —$Z^3$—Si— linearly linked in $R^a$.

One example is represented below, where Si atoms are linked via a $Z^3$ group in $R^a$.

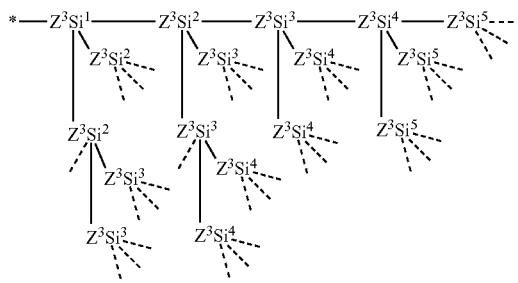

In the formula, "*" means a site bonded to Si of a main chain, and " . . . " means that a predetermined group other than $Z^3Si$ is bonded, namely, " . . . " means a position at which repeating of $Z^3Si$ is terminated in the case where all three bonds of a Si atom are " . . . ". The superscript number in Si means the number of occurrence of Si linearly linked via a $Z^3$ group when counted from "*". That is, a chain where repeating of $Z^3Si$ is terminated at $Si^2$ is a chain where the "number of Si atoms linearly linked via a $Z^3$ group in $R^{a''}$" is 2, and similarly, chains where repeating of $Z^3Si$ is terminated at $Si^3$, $Si^4$ and $Si^5$ mean chains where the "number of Si atoms linearly linked via a $Z^3$ group in $R^{a''}$" is 3, 4 and 5, respectively. As clear from the formula, a plurality of $Z^3Si$ chains are present in $R^a$, and all the chains do not necessarily have the same length, and, for example, may each have any length.

In a preferable embodiment, the "number of Si atoms linearly linked via a $Z^3$ group in $R^{a''}$" is 1 (left formula) or 2 (right formula) in all chains, as represented below.

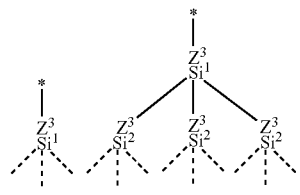

In one embodiment, the number of Si atoms linearly linked via a $Z^3$ group in $R^a$ is 1 or 2, preferably 1.

In the formulae, each $R^{72}$, at each occurrence, independently represents a hydroxyl group or a hydrolyzable group. The "hydrolyzable group" has the same meaning as described above.

Preferably, $R^{72}$ is —OR, wherein R represents a substituted or unsubstituted $C_{1-3}$ alkyl group, more preferably a methyl group.

In the formulae, each $R^{73}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p1, at each occurrence, is independently an integer of 0 to 3; each q1, at each occurrence, is independently an integer of 0 to 3; and each r1, at each occurrence, is independently an integer of 0 to 3, provided that the sum of p1, q1 and r1 with respect to (—$Z^3$—$SiR^{71}_{p1}R^{72}_{q1}R^{73}_{r1}$) is 3.

In a preferable embodiment, q1 in $R^{a'}$ ($R^a$ in the case where no $R^{a'}$ is present) at an end of $R^a$ is preferably 2 or more, for example, 2 or 3, more preferably 3.

In a preferable embodiment, at least one end of $R^a$ can be —$Si(-Z-SiR^{72}_{q1}R^{73}_{r1})_2R^{72}_{q1'}R^{73}_{r1'}$ (provided that either one of q1' and r1' is 1 and the other is 0), or —$Si(-Z^3-SiR^{72}_{q1}R^{73}_{r1})_3$, preferably —$Si(-Z^3-SiR^{72}_{q1}R^{73}_{r1})_3$ (wherein the total of q1 and r1 is 3). In the formula, a (—$Z^3$—$SiR^{72}_{q1}R^{73}_{r1}$) unit is preferably (—$Z^3$—$SiR^{72}_3$). In a further preferable embodiment, all ends of $R^a$ can be —$Si(-Z^3-SiR^{72}_{q1}R^{73}_{r1})_3$, preferably —$Si(-Z^3-SiR^{72}_3)_3$.

In a preferable embodiment, an end of a group represented by $(SiR^a_{k1}R^b_{l1}R^c_{m1})$ can be —$Si(-Z^3-SiR^{72}_{q1}R^{73}_{r1})_2R^b_{l1}R^c_{m1}$ (provided that any one of l1 and m1 is 1 and the other is 0), —$Si(-Z^3-SiR^{72}_{q1}R^{73}_{r1})_2R^{72}_{q1'}R^{73}_{r1'}$ (provided that any one of q1' and r1' is 1 and the other is 0), or —$Si(-Z^3-SiR^{72}_{q1}R^{73}_{r1})_3$, preferably —$Si(-Z^3-SiR^{72}_{q1}R^{73}_{r1})_3$ (wherein the total of q1 and r1 is 3). More preferably, an end of a group represented by $(SiR^a_{k1}R^b_{l1}R^c_{m1})$ is —$Si(-Z^3-SiR^{72}_3)_3$.

In the formulae, each $R^{a''}$, at each occurrence, independently represents —$Z^3$—$SiR^{71}_{p1}R^{72''}_{q1}R^{73}_{r1}$. $Z^3$, $R^{71}$, $R^{73}$, p1, q1 and r1 have the same meanings as described above. $R^{72''}$ has the same meaning as $R^{72}$.

In a preferable embodiment, at least one end of $R^{a'''}$ can be —Si(—$Z^3$—SiR$^{72'}_{q1}$R$^{73}_{r1}$)$_2$R$^{72''}_{q1'}$R$^{73}_{r1'}$ (provided that either one of q1' and r1' is 1 and the other is 0), or —Si(—$Z^3$—SiR$^{72''}_{q1}$R$^{73}_{r1}$)$_3$, preferably —Si(—$Z^3$—SiR$^{72''}_{q1}$R$^{73}_{r1}$)$_3$ (wherein the total of q1 and r1 is 3). In the formula, a (—$Z^3$—SiR$^{72''}_{q1}$R$^{73}_{r1}$)$_3$ unit is preferably (—$Z^3$—SiR$^{72''}_3$). In a further preferable embodiment, all ends of $R^a$ can be —Si(—$Z^3$—SiR$^{72''}_{q1}$R$^{73}_{r1}$)$_3$, preferably —Si(—$Z^3$—SiR$^{72''}_3$)$_3$.

In a preferable embodiment, an end of a group represented by (SiR$^{a''}_{k1}$R$^{b''}_{l1}$R$^{c''}_{m1}$) can be —Si(—$Z^3$—SiR$^{72''}_{q1}$R$^{73}_{r1}$)$_2$R$^{b''}_{l1}$R$^{c''}_{m1}$ (provided that any one of l1 and m1 is 1 and the other is 0), —Si(—$Z^3$—SiR$^{72''}_{q1}$R$^{73}_{r1}$)$_2$R$^{72''}_{q1'}$R$^{73}_{r1'}$ (provided that any one of q1' and r1' is 1 and the other is 0), or —Si(—$Z^3$—SiR$^{72''}_{q1}$R$^{73}_{r1}$)$_3$, preferably —Si(—$Z^3$—SiR$^{72''}_{q1}$R$^{73}_{r1}$)$_3$ (wherein the total of q1 and r1 is 3). More preferably, an end of a group represented by (SiR$^{a''}_{k1}$R$^{b''}_{l1}$R$^{c''}_{m1}$) is —Si(—$Z^3$—SiR$^{72''}_3$)$_3$.

At least two Si each bonding to the hydroxyl group or the hydrolyzable group are present in formula (C). That is, at least two structures selected from the group consisting of SiR$^{72}$ (specifically, a group represented by —SiR$^{71}_{p1}$R$^{72}_{q1}$R$^{73}_{r1}$, provided that q1 is an integer of 1 to 3), SiR$^{72''}$ (specifically, a group represented by —SiR$^{71}_{p1}$R$^{72''}_{q1}$R$^{73}_{r1}$, provided that q1 is an integer of 1 to 3), SiR$^b$ (specifically, a group represented by —SiR$^a_{k1}$R$^b_{l1}$R$^c_{m1}$, provided that l1 is an integer of 1 to 3) and SiR$^{b''}$ (specifically, a group represented by —SiR$^{a''}_{k1}$R$^{b''}_{l1}$R$^{c''}_{m1}$, provided that l1 is an integer of 1 to 3) are present. R$^b$ and R$^{b''}$ are described below.

More preferably, at least one Si bonding to the hydroxyl group or the hydrolyzable group is present at each of both ends of a molecular backbone of the PFPE-containing silane compound (a), in formula (C). That is, at least one SiR$^{72}$ and/or SiR$^b$ structure is present, and at least one SiR$^{72''}$ and/or SiR$^{b''}$ structure is present.

In the formulae, each R$^b$, at each occurrence, independently represents a hydroxyl group or a hydrolyzable group. R$^b$ preferably represents a hydroxyl group, —OR, —OCOR, —O—N=C(R)$_2$, —N(R)$_2$, —NHR, or halogen, wherein R represents a substituted or unsubstituted alkyl group having 1 to 4 carbon atoms, and R$^b$ more preferably represents —OR. Examples of R include unsubstituted alkyl groups such as a methyl group, an ethyl group, a propyl group, an isopropyl group, a n-butyl group and an isobutyl group; and substituted alkyl groups such as a chloromethyl group. Among them, an alkyl group, in particular, an unsubstituted alkyl group is preferable, and a methyl group or an ethyl group is more preferable. The hydroxyl group is not limited, and may be generated by hydrolyzing the hydrolyzable group. More preferably, R$^b$ represents —OR, wherein R represents a substituted or unsubstituted C$_{1-3}$ alkyl group, more preferably a methyl group.

In the formulae, R$^{b''}$ has the same meaning as R$^b$.

In the formulae, each R$^c$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, R$^{c''}$ has the same meaning as R$^c$.

In the formulae, each k1, at each occurrence, is independently an integer of 0 to 3; each l1, at each occurrence, is independently an integer of 0 to 3; and each m1, at each occurrence, is independently an integer of 0 to 3, provided that the sum of k1, l1 and m1 with respect to (SiR$^a_{k1}$R$^b_{l1}$R$^c_{m1}$) or with respect to (SiR$^{a'}_{k1}$R$^{b''}_{l1}$R$^{c''}_{m1}$) is 3.

In one embodiment, k1 is preferably 1 to 3, more preferably 3.

Such any compound represented by formula (C) can be synthesized as described in WO 2014/069592.

Formula (D):

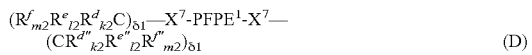
(D)

In formula (D), PFPE$^1$ has the same meaning as described with respect to formula (A).

In the formula, each X$^7$ independently represents a single bond or a di- to decavalent organic group. X$^7$ is understood to be a linker which links a perfluoro(poly)ether moiety (namely, -PFPE$^1$-moiety) mainly providing water-repellency, surface lubricity, and the like, and a moiety (namely, group in parentheses with δ1) providing a binding ability to the base material, in any compound represented by formula (D). Accordingly, X$^7$ may be a single bond or any organic group as long as such any compound represented by formula (D) can be stably present. Herein, a left portion and a right portion of the structure designated as X$^7$ are bonding to the group represented by PFPE$^1$ and the group in parentheses with δ1, respectively.

In another embodiment, X$^7$ represents X$^e$. X$^e$ has the same meaning as described above.

In the formulae, δ1 is an integer of 1 to 9, and δ1 may be varied depending on the valence of X$^7$. In formula (D), δ1 corresponds to a value obtained by subtracting 1 from the valence of X$^7$. In the case where X$^7$ is a single bond, δ1 is 1.

X$^7$ is preferably a di- to heptavalent, more preferably di- to tetravalent, further preferably divalent organic group.

In one embodiment, X$^7$ is a di- to tetravalent organic group, and δ1 is 1 to 3.

In another embodiment, X$^7$ is a divalent organic group, and δ1 is 1. In such a case, formula (D) is represented by the following formula (D'):

(D')

Examples of X$^7$ are not limited, and include the same as described with respect to X$^1$.

In particular, preferable specific examples of X$^7$ include a single bond,
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$—CH$_2$—O—CH$_2$—,
—CF$_2$—CH$_2$—O—(CH$_2$)$_2$—,
—CF$_2$—CH$_2$—O—(CH$_2$)$_3$—,
—CF$_2$—CH$_2$—O—(CH$_2$)$_6$—
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$Si(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_3$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_k$CF$_2$OCF(CF$_3$)CF$_2$OCF$_2$—, —CH₂OCH₂CF₂CF₂CF(CF₃)CF₂OCF₂CF₂—,
—CH₂OCH₂CF₂CF₂OCF(CF₃)CF₂OCF₂CF₂CF₂—,
—CH₂OCH₂CHFCF₂OCF₂—,
—CH₂OCH₂CHFCF₂OCF₂CF₂—,
—CH₂OCH₂CHFCF₂OCF₂CF₂CF₂—,
—CH₂OCH₂CHFCF₂OCF(CF₃)CF₂OCF₂—,
—CH₂OCH₂CHFCF₂OCF(CF₃)CF₂OCF₂CF₂—,
—CH₂OCH₂CHFCF₂OCF(CF₃)CF₂OCF₂CF₂CF₂—,
—CH₂OCF₂CHFOCF₂CF₂CF₂—C(O)NH—CH₂—,
—CH₂OCH₂(CH₂)₇CH₂Si(OCH₃)₂OSi(OCH₃)₂(CH₂)₂Si(OCH₃)₂OSi(OCH₃)₂(CH₂)₂—,
—CH₂OCH₂CH₂CH₂Si(OCH₃)₂OSi(OCH₃)₂(CH₂)₃—,
—CH₂OCH₂CH₂CH₂Si(OCH₂CH₃)₂OSi(OCH₂CH₃)₂(CH₂)₃—,
—CH₂OCH₂CH₂CH₂Si(OCH₃)₂OSi(OCH₃)₂(CH₂)₂—,
—CH₂OCH₂CH₂CH₂Si(OCH₂CH₃)₂OSi(OCH₂CH₃)₂(CH₂)₂—,
—(CH₂)₂—Si(CH₃)₂—(CH₂)₂—,
—CH₂—,
—(CH₂)₂—,
—(CH₂)₃—,
—(CH₂)₄—,
—(CH₂)₅—,
—(CH₂)₆—,
—CF₂—,
—(CF₂)₂—,
—CF₂—CH₂—,
—CF₂—(CH₂)₂—,
—CF₂—(CH₂)₃—,
—CF₂—(CH₂)₄—,
—CF₂—(CH₂)₅—,
—CF₂—(CH₂)₆—,
—CO—,
—CONH—,
—CONH—CH₂—,
—CONH—(CH₂)₂—,
—CONH—(CH₂)₃—,
—CONH—(CH₂)₆—,
—CF₂CONH—,
—CF₂CONHCH₂—,
—CF₂CONH(CH₂)₂—,
—CF₂CONH(CH₂)₃—,
—CON(CH₃)—(CH₂)₆—,
—CON(Ph)-(CH₂)₃—, wherein Ph means phenyl,
—CON(CH₃)—(CH₂)₆—,
—CON(Ph)-(CH₂)₆—, wherein Ph means phenyl,
—CF₂—CON(CH₃)—(CH₂)₃—,
—CF₂—CON(Ph)-(CH₂)₃—, wherein Ph means phenyl,
—CF₂—CON(CH₃)—(CH₂)₆—,
—CF₂—CON(Ph)-(CH₂)₆—, wherein Ph means phenyl,
—CONH—(CH₂)₂NH(CH₂)₃—,
—CONH—(CH₂)₆NH(CH₂)₃—,
—CH₂O—CONH—(CH₂)₃—,
—CH₂O—CONH—(CH₂)₆—,
—S—(CH₂)₃—,
—(CH₂)₂S(CH₂)₃—,
—CONH—(CH₂)₃Si(CH₃)₂OSi(CH₃)₂(CH₂)₂—,
—CONH—(CH₂)₃Si(CH₃)₂OSi(CH₃)₂OSi(CH₃)₂(CH₂)₂—,
—CONH—(CH₂)₃Si(CH₃)₂O(Si(CH₃)₂O)₂Si(CH₃)₂(CH₂)₂—,
—CONH—(CH₂)₃Si(CH₃)₂O(Si(CH₃)₂O)₃Si(CH₃)₂(CH₂)₂—,
—CONH—(CH₂)₃Si(CH₃)₂O(Si(CH₃)₂O)₁₀Si(CH₃)₂(CH₂)₂—,
—CONH—(CH₂)₃Si(CH₃)₂O(Si(CH₃)₂O)₂₀Si(CH₃)₂(CH₂)₂—,
—C(O)O—(CH₂)₃—,
—C(O)O—(CH₂)₆—,
—CH₂—O—(CH₂)₃—Si(CH₃)₂—(CH₂)₂—Si(CH₃)₂—(CH₂)₂—,
—CH₂—O—(CH₂)₃—Si(CH₃)₂—(CH₂)₂—Si(CH₃)₂—CH(CH₃)—,
—CH₂—O—(CH₂)₃—Si(CH₃)₂—(CH₂)₂—Si(CH₃)₂—(CH₂)₃—,
—CH₂—O—(CH₂)₃—Si(CH₃)₂—(CH₂)₂—Si(CH₃)₂—CH(CH₃)—CH₂—,
—OCH₂—,
—O(CH₂)₃—, and
—OCFHCF₂—

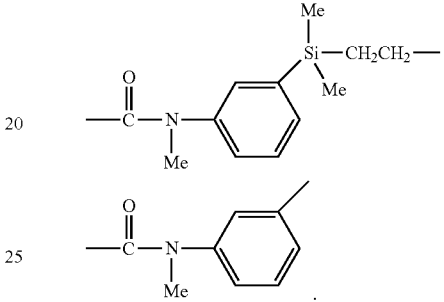

In particular, specific $X^7$ is more preferably
—CH₂OCH₂—,
—CH₂O(CH₂)₂—,
—CH₂O(CH₂)₃—,
—CH₂O(CH₂)₆—,
—CF₂—CH₂—O—CH₂—,
—CF₂—CH₂—O—(CH₂)₂—,
—CF₂—CH₂—O—(CH₂)₃—,
—CF₂—CH₂—O—(CH₂)₆—,
—CH₂OCF₂CHFOCF₂—,
—CH₂OCF₂CHFOCF₂CF₂—,
—CH₂OCF₂CHFOCF₂CF₂CF₂—,
—CH₂OCH₂CF₂CF₂OCF₂—,
—CH₂OCH₂CF₂CF₂OCF₂CF₂—,
—CH₂OCH₂CF₂CF₂OCF₂CF₂CF₂—,
—CH₂OCH₂CF₂CF₂OCF(CF₃)CF₂OCF₂—,
—CH₂OCH₂CF₂CF₂OCF(CF₃)CF₂OCF₂CF₂—,
—CH₂OCH₂CF₂CF₂OCF(CF₃)CF₂OCF₂CF₂CF₂—,
—CH₂OCH₂CHFCF₂OCF₂—,
—CH₂OCH₂CHFCF₂OCF₂CF₂—,
—CH₂OCH₂CHFCF₂OCF₂CF₂CF₂—,
—CH₂OCH₂CHFCF₂OCF(CF₃)CF₂OCF₂—,
—CH₂OCH₂CHFCF₂OCF(CF₃)CF₂OCF₂CF₂—,
—CH₂OCH₂CHFCF₂OCF(CF₃)CF₂OCF₂CF₂CF₂—,
—CH₂OCF₂CHFOCF₂CF₂CF₂—C(O)NH—CH₂—,
—CF₂—CH₂OCF₂CHFOCF₂CF₂CF₂—C(O)NH—CH₂—,
—CH₂—,
—(CH₂)₂—,
—(CH₂)₃—,
—(CH₂)₄—,
—(CH₂)₅—,
—(CH₂)₆—,
—CF₂—,
—(CF₂)₂—,
—CF₂—CH₂—,
—CF₂—(CH₂)₂—,
—CF₂—(CH₂)₃—,
—CF₂—(CH₂)₄—,
—CF₂—(CH₂)₅—, —CF$_2$—(CH$_2$)$_6$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CH$_3$)—(CH$_2$)$_3$—,
—CF$_2$—CON(Ph)-(CH$_2$)$_3$—, where in Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—OCH$_2$—,
—O(CH$_2$)$_3$—,
—OCFHCF$_2$—.

In particular, $X^7$ is more preferably
—CH$_2$OCF$_2$CHFOCF$_2$CF$_2$CF$_2$—C(O)NH—CH$_2$—,
—CF$_2$—CH$_2$OCF$_2$CHFOCF$_2$CF$_2$CF$_2$—C(O)NH—CH$_2$—,
—CONH—,
—CONH—CH$_2$—,
—CONH—(CH$_2$)$_2$—,
—CONH—(CH$_2$)$_3$—,
—CONH—(CH$_2$)$_6$—,
—CF$_2$CONH—,
—CF$_2$CONHCH$_2$—,
—CF$_2$CONH(CH$_2$)$_2$—,
—CF$_2$CONH(CH$_2$)$_3$—,
—CF$_2$CONH(CH$_2$)$_6$—,
—CON(CH$_3$)—(CH$_2$)$_3$—,
—CON(Ph)-(CH$_2$)$_3$—, wherein Ph means phenyl,
—CON(CH$_3$)—(CH$_2$)$_6$—,
—CON(Ph)-(CH$_2$)$_6$—, wherein Ph means phenyl,
—CF$_2$—CON(CH$_3$)—(CH$_2$)$_3$—,
—CF$_2$—CON(Ph)-(CH$_2$)$_3$—, wherein Ph means phenyl,
—CF$_2$—CON(CHO)—(CH$_2$)$_6$—,
—CF$_2$—CON(Ph)-(CH$_2$)$_6$—, wherein Ph means phenyl,
—CONH—(CH$_2$)$_2$NH(CH$_2$)$_3$—,
—CONH—(CH$_2$)$_6$NH(CH$_2$)$_3$—.

In a more preferable embodiment, $X^7$ represents $X^{e'}$. $X^{e'}$ has the same meaning as described above.

In one embodiment, $X^{e'}$ is a single bond. In the present embodiment, PFPE$^1$ and a group having a binding ability to the base material (namely, group in parentheses with δ1 in formula (D)) are directly bonded. It is considered that such a structure is included to thereby strengthen a bonding force between PFPE$^1$ and the group in parentheses with δ1. It is also considered that a carbon atom (namely, in the group in parentheses with δ1, a carbon atom bonding to $R^d$, $R^e$ and $R^f$ or a carbon atom bonding to $R^{d'''}$, $R^{e''}$ and $R^{f''}$) directly bonding to PFPE$^1$ is less biased in charge and, as a result, a nucleophilic reaction or the like hardly occurs at the carbon atom and the compound is stably bonding to the base material. Such a structure has the advantage of being capable of more enhancing friction durability of a layer formed by the PFPE-containing silane compound (a).

In the formulae, each $R^d$, at each occurrence, independently represents —Z$^4$—CR$^{81}_{p2}$R$^{82}_{q2}$R$^{83}_{r2}$.

In the formulae, each $Z^4$, at each occurrence, independently represents an oxygen atom or a divalent organic group.

$Z^4$ is preferably a $C_{1-6}$ alkylene group, —(CH$_2$)$_9$—O—(CH$_2$)$_h$—, wherein g is an integer of 0 to 6, for example, an integer of 1 to 6, and h is an integer of 0 to 6, for example, an integer of 1 to 6, or -phenylene-(CH$_2$)$_3$—, wherein i is an integer of 0 to 6, more preferably a $C_{1-3}$ alkylene group. Such a group is optionally substituted with one or more substituents selected from, for example, a fluorine atom, a $C_{1-6}$ alkyl group, a $C_{2-6}$ alkenyl group and a $C_{2-6}$ alkynyl group.

In the formulae, each $R^{81}$, at each occurrence, independently represents $R^{d'}$. $R^{d'}$ has the same meaning as $R^d$.

The number of C linearly linked via a $Z^4$ group in $R^d$ is at most 5. That is, in the case where at least one $R^{81}$ is present in $R^d$, two or more C atoms linearly linked via a $Z^4$ group are present in $R^d$, and the number of such C atoms linearly linked via a $Z^4$ group is at most 5. Herein, the "number of C atoms linearly linked via a $Z^4$ group in $R^d$" is equal to the number of repeating units of —Z$^4$—C— linearly linked in $R^d$.

In a preferable embodiment, the "number of C atoms linearly linked via a $Z^4$ group in $R^d$" is 1 (left formula) or 2 (right formula) in all chains, as represented below.

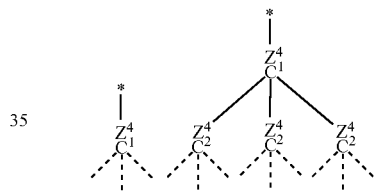

In one embodiment, the number of C atoms linearly linked via a $Z^4$ group in $R^d$ is 1 or 2, preferably 1.

In the formulae, each $R^{82}$, at each occurrence, independently represents —Y—SiR$^{85}_{n2}$R$^{86}_{3-n2}$.

Each Y, at each occurrence, independently represents a divalent organic group.

In a preferable embodiment, Y is a $C_{1-6}$ alkylene group, —(CH$_2$)$_{q'}$—O—(CH$_2$)$_{h'}$—, wherein g' is an integer of 0 to 6, for example, an integer of 1 to 6, and h' is an integer of 0 to 6, for example, an integer of 1 to 6, or -phenylene-(CH$_2$)$_{i'}$—, wherein i' is an integer of 0 to 6. Such a group is optionally substituted with one or more substituents selected from, for example, a fluorine atom, a $C_{1-6}$ alkyl group, a $C_{2-6}$ alkenyl group and a $C_{2-6}$ alkynyl group.

In one embodiment, Y can be a $C_{1-6}$ alkylene group or -phenylene-(CH$_2$)$_{i'}$—. In the case where Y is any of the above groups, light resistance, in particular, ultraviolet resistance can be more enhanced.

Each $R^{85}$, at each occurrence, independently represents a hydroxyl group or a hydrolyzable group.

Examples of the "hydrolyzable group" include the same as in formula (C).

Preferably, $R^{85}$ is —OR, wherein R represents a substituted or unsubstituted $C_{1-3}$ alkyl group, more preferably an ethyl group or a methyl group, in particular, a methyl group.

Each $R^{86}$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

n2 with respect to a ($-Y-SiR^{85}{}_{n2}R^{86}{}_{3-n2}$) unit or with respect to a ($-Y-SiR^{85''}{}_{n2}R^{86''}{}_{3-n2}$) unit independently represents an integer of 0 to 3, preferably an integer of 1 to 3, more preferably 2 or 3, particularly preferably 3. $R^{85''}$ and $R^{86''}$ are described below.

Each $R^{83}$, at each occurrence, independently represents a hydrogen atom, a hydroxyl group or a lower alkyl group, preferably a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, each p2, at each occurrence, is independently an integer of 0 to 3; each q2, at each occurrence, is independently an integer of 0 to 3; and each r2, at each occurrence, is independently an integer of 0 to 3, provided that the sum of p2, q2 and r2 with respect to ($-Z^4-CR^{81}{}_{p2}R^{82}{}_{q2}R^{83}{}_{r2}$) or with respect to ($-Z^4-CR^{81}{}_{p2}R^{82''}{}_{q2}R^{83}{}_{r2}$) is 3. $R^{82''}$ is described below.

In a preferable embodiment, in $R^{d'}$ at an end of $R^d$ ($R^d$ in the case where no $R^{d'}$ is present), q2 is preferably 2 or more, for example, 2 or 3, more preferably 3.

In a preferable embodiment, at least one end of $R^d$ can be $-C(-Y-SiR^{85}{}_{n2}R^{86}{}_{3-n2})_2$ (specifically, $-C(-Y-SiR^{85}{}_{n2}R^{86}{}_{3-n2})_2R^{83}$) or $-C(-Y-SiR^{85}{}_{n2}R^{86}{}_{3-n2})_3$, preferably $-C(-Y-SiR^{85}{}_{n2}R^{86}{}_{3-n2})_3$. Here, n2 is an integer of 1 to 3. In the formulae, a ($-Y-SiR^{85}{}_{n2}R^{86}{}_{3-n2}$) unit is preferably ($-Y-SiR^{85}{}_3$). In a further preferable embodiment, all ends of $R^d$ can be each $-C(-Y-SiR^{85}{}_{n2}R^{85}{}_{3-n2})_3$, preferably $-C(-Y-SiR^{85}{}_3)_3$.

In a more preferable embodiment, an end of a group represented by $(CR^d{}_{k2}R^e{}_{l2}R^f{}_{m2})$ is $C(-Y-SiR^{85}{}_{n2}R^{86}{}_{3-n2})_2R^f$, $C(-Y-SiR^{85}{}_{n2}R^{86}{}_{3-n2})_2R^{83}$ or $C(-Y-SiR^{85}{}_{n2}R^{86}{}_{3-n2})_3$, preferably $C(-Y-SiR^{85}{}_{n2}R^{86}{}_{3-n2})_3$. Here, n2 is an integer of 1 to 3. In the formulae, a ($-Y-SiR^{85}{}_{n2}R^{86}{}_{3-n2}$) unit is preferably ($-Y-SiR^{85}{}_3$). In a further preferable embodiment, all ends of the group can be each $-C(-Y-SiR^{85}{}_{n2}R^{86}{}_{3-n2})_3$, preferably $-C(-Y-SiR^{85}{}_3)_3$.

In the formulae, each $R^{d''}$, at each occurrence, independently represents $-Z^4-CR^{81}{}_{p2}R^{82''}{}_{q2}R^{83}{}_{r2}$. $Z^4$, $R^{81}$, $R^{83}$, p2, q2 and r2 have the same meanings as described above. Each $R^{82''}$, at each occurrence, independently represents $-Y-SiR^{85''}{}_{n2}R^{86''}{}_{3-n2}$. Here, Y and n2 have the same meanings as described above. $R^{85''}$ and $R^{86''}$ have the same meanings as $R^{85}$ and $R^{86}$, respectively.

In a preferable embodiment, in $R^{d'}$ at an end of $R^{d''}$ ($R^{d''}$ in the case where no $R^{d'}$ is present), q2 is preferably 2 or more, for example, 2 or 3, more preferably 3.

In a preferable embodiment, at least one end of $R^{d''}$ can be $-C(-Y-SiR^{85''}{}_{n2}R^{86''}{}_{3-n2})_2$ (specifically, $-C(-Y-SiR^{85''}{}_{n2}R^{86''}{}_{3-n2})_2R^{83}$) or $-C(-Y-SiR^{85''}{}_{n2}R^{86''}{}_{3-n2})_3$, preferably $-C(-Y-SiR^{85''}{}_{n2}R^{86''}{}_{3-n2})_3$. Here, n2 is an integer of 1 to 3. In the formulae, a ($-Y-SiR^{85''}{}_{n2}R^{86''}{}_{3-n2}$) unit is preferably ($-Y-SiR^{8''}{}_3$). In a further preferable embodiment, all ends of $R^d$ can be each $-C(-Y-SiR^{85''}{}_{n2}R^{86''}{}_{3-n2})_3$, preferably $-C(-Y-SiR^{85''}{}_3)_3$.

In a more preferable embodiment, an end of a group represented by $(CR^{d''}{}_{k2}R^{e''}{}_{l2}R^{f''}{}_{m2})$ is $C(-Y-SiR^{85''}{}_{n2}R^{86''}{}_{3-n2})_2R^{f''}$, $C(-Y-SiR^{85''}{}_{n2}R^{86''}{}_{3-n2})_2R^{83}$ or $C(-Y-SiR^{85''}{}_{n2}R^{86''}{}_{3-n2})_3$, preferably $C(-Y-SiR^{85''}{}_{n2}R^{86''}{}_{3-n2})_3$. Here, n2 is an integer of 1 to 3. In the formulae, a ($-Y-SiR^{85''}{}_{n2}R^{86''}{}_{3-n2}$) unit is preferably ($-Y-SiR^{85''}{}_3$). In a further preferable embodiment, all ends of the group can be each $-C(-Y-SiR^{85''}{}_{n2}R^{86''}{}_{3-n2})_3$, preferably $-C(-Y-SiR^{85''}{}_3)_3$.

In the formulae, each $R^e$, at each occurrence, independently represents $-Y-SiR^{85}{}_{n2}R^{86}{}_{3-n2}$. Here, Y, $R^{85}$, $R^{86}$ and n2 have the same meanings as described in $R^{82}$.

In the formulae, each $R^{e''}$, at each occurrence, independently represents $-Y-SiR^{85''}{}_{n2}R^{86''}{}_{3-n2}$. Here, $R^{85''}$, $R^{86''}$, Y, and n2 have the same meanings as described above.

In the formulae, each $R^f$, at each occurrence, independently represents a hydrogen atom, a hydroxyl group or a lower alkyl group. Preferably, each $R^f$, at each occurrence, independently represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, $R^{f''}$ has the same meaning as $R^f$.

In the formulae, each k2, at each occurrence, is independently an integer of 0 to 3; each l2, at each occurrence, is independently an integer of 0 to 3; and each m2, at each occurrence, is independently an integer of 0 to 3, provided that the sum of k2, l2 and m2 is 3.

In one embodiment, at least one k2 is 2 or 3, preferably 3.

In one embodiment, k2 is 2 or 3, preferably 3.

In one embodiment, l2 is 2 or 3, preferably 3.

In formula (D), two or more groups selected from the group consisting of a group represented by $-Y-SiR^{85}$ and a group represented by $-Y-SiR^{85''}$ are present. In formula (D), preferably, one or more groups represented by $-Y-SiR^{85}$ and one or more groups represented by $-Y-SiR^{85''}$ are present.

More preferably, one or more carbon atoms each bonding to two or more groups each represented by $-Y-SiR^{85}{}_{n2}R^{86}{}_{3-n2}$ are present, and one or more carbon atoms each bonding to two or more groups each represented by $-Y-SiR^{85''}{}_{n2}R^{86''}{}_{3-n2}$ are present, wherein n2 is an integer of 1 to 3.

That is, one or more groups selected from a group represented by $-C-R^d{}_{k2}(Y-SiR^{85}{}_{n2}R^{86}{}_{3-n2})_{l2}R^f{}_{m2}$ (provided that l2 is 2 or 3 and the total of k2, l2 and m2 is 3) and a group represented by $-C-R^{81}{}_{p2}(Y-SiR^{85}{}_{n2}R^{86}{}_{3-n2})_{q2}R^{83}{}_{r2}$ (provided that q2 is 2 or 3 and the total of p2, q2 and r2 is 3), and one or more groups selected from a group represented by $-C-{}^d{}_{k2}R(Y-SiR^{85''}{}_{n2}R^{86''}{}_{3-n2})_{l2}R^f{}_{m2}$ (provided that l2 is 2 or 3 and the total of k2, l2 and m2 is 3) and a group represented by $-C-R^{81}{}_{p2}(Y-SiR^{85''}{}_{n2}R^{86''}{}_{3-n2})_{q2}R^{83}{}_{r2}$ (provided that q2 is 2 or 3 and the total of p2, q2 and r2 is 3), wherein n2 is an integer of 1 to 3, are preferably present.

In one embodiment, one or more groups each represented by $-C-(Y-SiR^{85}{}_{n2}R^{86}{}_{3-n2})_2$ and one or more groups each represented by $-C-(Y-SiR^{85''}{}_{n2}R^{86''}{}_{3-n2})_2$, wherein n2 is an integer of 1 to 3, are preferably present in formula (D).

In one embodiment, one or more groups each represented by $-C-(Y-SiR^{85}{}_{n2}R^{86}{}_{3-n2})_3$ and one or more groups each represented by $-C-(Y-SiR^{85''}{}_{n2}R^{86''}{}_{3-n2})_3$, wherein n2 is an integer of 1 to 3, are preferably present in formula (D).

In formula (D), n2 is an integer of 1 to 3 and at least one q2 is 2 or 3, or at least one l2 is 2 or 3.

In formula (D), at least two of $-Y-SiR^{85}{}_{n2}R^{86}{}_{3-n2}$ group and $-Y-SiR^{85''}{}_{n2}R^{86''}{}_{3-n2}$ group are preferably present. In formula (D), one or more $-Y-SiR^{85}{}_{n2}R^{86}{}_{3-n2}$ groups and one or more $-Y-SiR^{85''}{}_{n2}R^{86''}{}_{3-n2}$ groups are more preferably present. That is, a group containing $-SiR^{85}$ and a group containing $-SiR^{85''}$ are preferably present at each of both ends of a molecular backbone of the PFPE-containing silane compound (a).

The compound represented by formula (D) can be produced by combining known methods.

In a preferable embodiment, the PFPE-containing silane compound (a) is represented by formula (B) or (C).

In one embodiment, the PFPE-containing silane compound (a) is represented by formula (A), (C) or (D).

In one embodiment, on at least one end of the PFPE-containing silane compound (a), there is two or more, preferably three or more Si atoms each having a hydroxyl group or a hydrolyzable group.

In one embodiment, the PFPE-containing silane compound (a) can have a number average molecular weight of $5 \times 10^2$ to $1 \times 10^5$, without any limitation. In particular, the compound preferably has a number average molecular weight of 2,000 to 50,000, more preferably 2,500 to 30,000, further preferably 3,000 to 10,000. In the present invention, the number average molecular weight is defined as a value obtained by $^{13}$F-NMR measurement.

(Cross-Linking Agent)

The cross-linking agent is not limited as long as the agent is a compound having a moiety which can undergo a crosslinking reaction (condensation reaction) with the PFPE-containing silane compound (a) (specifically, a silane moiety having a hydroxyl group or a hydrolyzable group bonding to a Si atom of the PFPE-containing silane compound (a)). The PFPE-containing silane compound (a) and the cross-linking agent can be included, thereby improving physical properties (for example, tensile strength and elastic modulus) of a cured product obtained from the curable composition of the present invention.

The cross-linking agent is an organosilicon compound having at least two —O—$R^{g3}$(s) each bonding to a Si atom. In the formula, each $R^{g3}$, at each occurrence, independently represents a hydrogen atom or a monovalent organic group. The monovalent organic group means a carbon atom-containing group. Such a monovalent organic group is not limited, and examples thereof include a group where one hydrogen atom is further removed from a hydrocarbon group. The hydrocarbon group has the same meaning as described above.

The cross-linking agent has a structure different from the structure of the PFPE-containing silane compound (a).

Examples of the cross-linking agent can include
an organic compound where $R^{g3}$ is a hydrogen atom, namely, an organosilicon compound having at least two silanol groups in one molecule, and
any organosilicon compound represented by formulae (E3) to (E5) described below.

Organosilicon compound having at least two silanol groups in one molecule:

Such silanol groups are preferably present at both respective ends of a molecular backbone in the organosilicon compound. The molecular backbone here represents a relatively longest binding chain in a molecule of the organosilicon compound.

Examples of the compound having silanol groups at both respective ends of a molecular backbone can include a compound represented by the following formula (E1) or (E2).

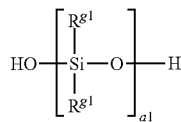

(E1)

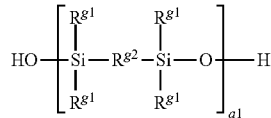

(E2)

In formula (E1) or (E2), each $R^{g1}$, at each occurrence, is independently a substituted or unsubstituted monovalent hydrocarbon group having 1 to 8 carbon atoms. Specific examples of $R^{g1}$ include alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group and a decyl group; cycloalkyl groups such as a cyclopentyl group, a cyclohexyl group and a cycloheptyl group; alkenyl groups such as a vinyl group, an allyl group, a propenyl group, an isopropenyl group, a butenyl group, an isobutenyl group, a hexenyl group and a cyclohexenyl group; aryl groups such as a phenyl group, a tolyl group, a xylyl group and a naphthyl group; aralkyl groups such as a benzyl group, a phenylethyl group and a phenylpropyl group; and groups where some or all hydrogen atoms of such a group are substituted with a halogen atom (for example, a chloromethyl group, a bromoethyl group, a chloropropyl group, a trifluoropropyl group and a nonafluorohexyl group).

In formula (E1) or (E2), each RP, at each occurrence, is independently a substituted or unsubstituted divalent hydrocarbon group having 1 to 20 carbon atoms, preferably 2 to 10 carbon atoms. Specific examples of R include alkylene groups such as a methylene group, an ethylene group, a propylene group, a methylethylene group, a butylene group and a hexamethylene group; cycloalkylene groups such as a cyclohexylene group, arylene groups such as a phenylene group, a tolylene group, a xylylene group, a naphthylene group and a biphenylene group; a group where some or all hydrogen atoms of such a group are substituted with a halogen atom; and a combination of such a substituted or unsubstituted alkylene group and an arylene group. Among them, $R^{g2}$ is preferably a methylene group, an ethylene group, a propylene group, a butylene group, a hexamethylene group, a cyclohexylene group or a phenylene group, and is particularly preferably an ethylene group, a propylene group, a butylene group or a phenylene group. Examples of the compound having silanol groups in a molecule include a resin compound including a bond of one unit of $R^{g1}{}_3SiO_{1/2}$, $R^{g1}{}_2SiO$, $R^{g1}SiO_{3/2}$, and $SiO_2$, or a combination of two or more kinds thereof, with a silanol group. Constituent units of the resin compound may be directly bonded or may be bonded via a di- or higher valent hydrocarbon group.

In formula (E1) or (E2), each ε1, at each occurrence, is independently an integer of 1 or more, and ε1 is preferably 2 or more, more preferably 5 or more, preferably 50 or less, more preferably 20 or less.

The organosilicon compound having at least two silanol groups in one molecule (specifically, compound represented by formula (E1) or (E2)) preferably has no PFPE structure in a molecular structure.

Any organosilicon compound represented by formula (E3), (E4) or (E5):

$$(R^{g3}-O)_{\varepsilon 2}-Si-R^{g4}{}_{4-\varepsilon 2}$$ (E3)

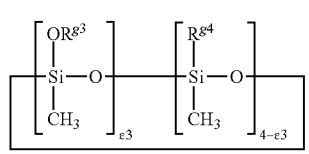

(E4)

(E5)

In formulae (E3) and (E4), $R^{g3}$ has the same meaning as described above. $R^{g3}$ is a moiety which can react with a moiety having a hydroxyl group or a hydrolyzable group bonding to a Si atom of the PFPE-containing silane compound (a) represented by formula (A), (B), (C) or (D).

$R^{g3}$ is preferably a monovalent organic group.

Each $R^{g3}$—, at each occurrence, is more preferably independently $CH_3$—, $C_2H_5$—, $C_3H_7$—, $CF_3CH_2$—, $CH_3CO$—, $CH_2$=$C(CH_3)$—, $CH_3CH_2C(CH_3)$=$N$—, $(CH_3)_2N$—, $(C_2H_5)_2N$—, $CH_2$=$C(OC_2H_5)$—, $(CH_3)_2C$=$C(OC_8H_{17})$—, or

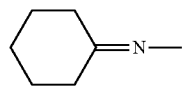

In formulae (E3) and (E4), each $R^{g4}$, at each occurrence, is independently a monovalent organic group. $R^{g4}$ is preferably a substituted or unsubstituted monovalent hydrocarbon group, more preferably a substituted or unsubstituted monovalent hydrocarbon group having 1 to 12 carbon atoms. Specific examples of R; can include alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group and a decyl group; cycloalkyl groups such as a cyclopentyl group, a cyclohexyl group and a cycloheptyl group; aryl groups such as a phenyl group, a tolyl group, a xylyl group and a naphthyl group; aralkyl groups such as a benzyl group, a phenylethyl group and a phenylpropyl group; alkenyl groups such as a vinyl group, an allyl group, a propenyl group and a butenyl group; and groups where some or all hydrogen atoms of such a group are substituted with a halogen atom such as fluorine, chlorine or bromine (for example, a chloromethyl group, a bromoethyl group, a chloropropyl group, a trifluoropropyl group and a 3,3,4,4,5,5,6,6,6-nonafluorohexyl group).

In one embodiment, $R^{g4}$ can be a group represented by the following general formula.

$Rf^1$—$R^{g5}$—

In the formulae, $Rf^1$ is a monovalent fluorinated (poly)ether group. Examples of $Rf^1$ include one having a structure where $CF_3O$—, $CF_3CF_2O$—, $CF_3CF_2CF_2O$—, $(CF_3)_2CFO$—, $CF_3CF_2CF_2CF_2O$— or the like is bonding to a $CF_2$ end of $PFPE^1$ above.

$R^{g5}$ is a divalent organic group. The divalent organic group has the same meaning as described above.

$R^{g5}$ can be a substituted or unsubstituted divalent hydrocarbon group, for example, optionally containing one or more of an oxygen atom, a nitrogen atom, a silicon atom and a sulfur atom, and optionally containing an amide bond or a sulfonamide bond. The divalent hydrocarbon group preferably has 2 to 20 carbon atoms. Specific examples of a substituted or unsubstituted divalent hydrocarbon group not having any oxygen atom, nitrogen atom, silicon atom or sulfur atom interposed and not containing any amide bond or sulfonamide bond include alkylene groups such as an ethylene group, a propylene group, a methylethylene group, a butylene group and a hexamethylene group; cycloalkylene groups such as a cyclohexylene group; arylene groups such as a phenylene group, a tolylene group, a xylylene group, a naphthylene group and a biphenylene group; a combination of any alkylene group and any arylene group; and a group where some or all hydrogen atoms of such alkylene group and arylene group are substituted with a halogen atom.

The divalent hydrocarbon group can contain an oxygen atom in the form of —O—, a nitrogen atom in the form of —$NR^{g51}$— ($R^{g51}$ is a hydrogen atom or an alkyl group or aryl group having 1 to 10 carbon atoms) or —N=, a silicon atom in the form of —$SiR^{g52}R^{g53}$— ($R^{g52}$ and $R^{g53}$, at each occurrence, are each independently an alkyl group or aryl group having 1 to 10 carbon atoms), and/or a sulfur atom in the form of —S—. The divalent hydrocarbon group can contain an amide bond in the form of —C(O)$NR^{g51}$— ($R^{g51}$ is the same as described above) and/or a sulfonamide bond in the form of —$SO_2NR^{g51}$— ($R^{g51}$ is the same as described above). Specific examples of such a divalent hydrocarbon group include the following. In the following formulae, Me represents a methyl group and Ph represents a phenyl group, and an $Rf^1$ group is bonding to a left portion of each of the following formulae.

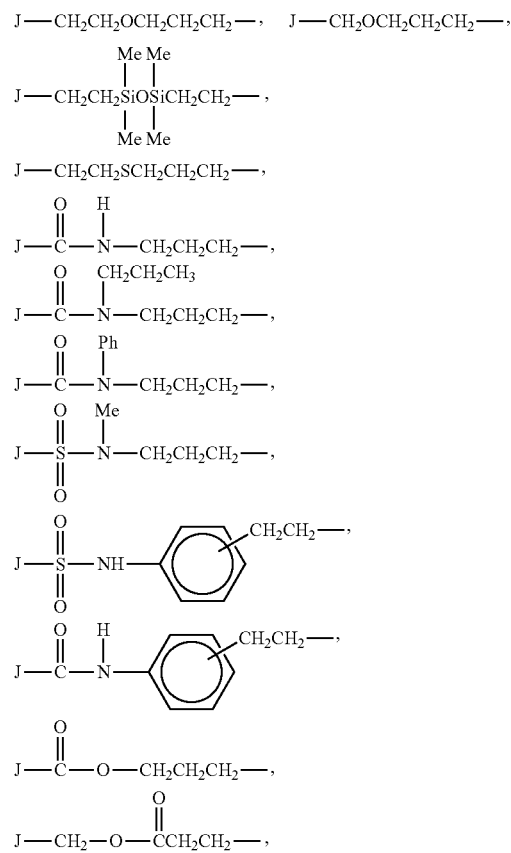

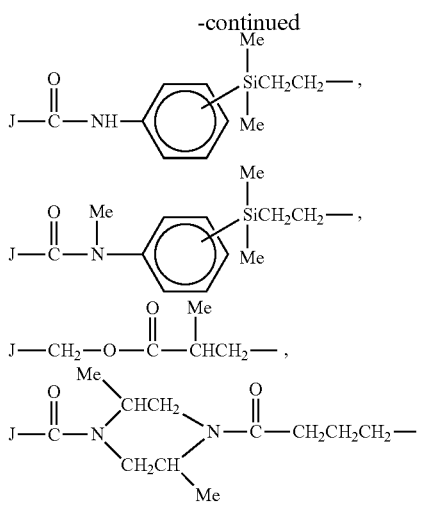

J represents a bonding site.

In formulae (E3) and (E4), each ε2, at each occurrence, is independently 2 or 3, and each ε3, at each occurrence, is independently 2 or 3.

In formula (E5), $R^{g3}$ and $R^{g4}$ have the same meaning as described above. In formula (E5), each $R^{g6}$—, at each occurrence, independently represents $R^{g8}$—$R^{g7}$—.

Each $R^{g7}$, at each occurrence, independently represents a single bond, an oxygen atom or a divalent organic group. The divalent organic group is as described above.

$R^{g7}$ is preferably an alkylene group having 1 to 10 carbon atoms or a group having 1 to 10 carbon atoms and containing a nitrogen atom or an oxygen atom in a main chain.

$R^{g7}$ is more preferably
an alkylene group having 1 to 3 carbon atoms,
$CH_2CH_2$—NH—$CH_2CH_2CH_2$, or
$CH_2$—O—$CH_2CH_2CH_2$.

$R^{g8}$ is a reactive functional group. Each $R^{g8}$, at each occurrence, is preferably independently an amino group, an epoxy group, a methacrylic group, a vinyl group or a mercapto group, more preferably an amino group.

In formula (E5), ε4 is an integer of 2 or more, preferably 2 or 3, more preferably 3. In formula (E5), ε5 is an integer of 0 or more, preferably 0 or 1. In formula (E5), ε6 is 1 or 2, preferably 1, provided that the sum of ε4, ε5 and ε6 is 4.

In formula (E5), preferably ε4 is 2 or 3, ε5 is 0 or 1 and ε6 is 1 or 2, more preferably 4 is 3, ε5 is 0 and ε6 is 1.

Preferably, the cross-linking agent is any compound represented by formula (E3) or formula (E5), more preferably any compound represented by formula (E3).

In one embodiment, the cross-linking agent does not have any group represented by PFPE in a molecular chain.

In one embodiment, the molecular weight of the cross-linking agent is 1,000 or less, preferably 600 or less, more preferably 250 or less. The lower limit of the molecular weight of the cross-linking agent may be 50 or more or 100 or more.

In a preferable embodiment, the cross-linking agent is at least one selected from the group consisting of tetraethoxysilane, tetratrimethoyxsilane, methyltriethoxysilane, methyltrimethoxysilane, dimethyldimethoxysilane, dimethyltrimethoxysilane, aminopropyltriethoxysilane, amiriopropyltrimethoxysilane, tridecafluoro-n-octyltriethoxysilane and tridecafluoro-n-octyltrimethoxysilane.

The cross-linking agent may be used singly or in combinations of two or more kinds thereof.

The curable composition of the present invention can include, for example, 0.1 parts by mass or more, specifically 0.3 parts by mass or more, and 30 parts by mass or less, specifically, 10 parts by mass or less of the cross-linking agent based on 100 parts by mass of the PFPE-containing silane compound (a).

The curable composition of the present invention can include, for example, 0.1 to 30 parts by mass, specifically 0.3 to 10 parts by mass, more specifically 0.3 to 5.0 parts by mass of the cross-linking agent based on 100 parts by mass of the PFPE-containing silane compound (a).

The cross-linking agent can contain, for example, 1 mol or more, specifically 2 mol or more of —O—$R^{g3}$ based on 1 mol of the hydroxyl group or hydrolyzable group bonding to any Si atom of the PFPE-containing silane compound, in the curable composition of the present invention. The cross-linking agent can contain, for example, 30 mol or less, specifically 20 mol or less, more specifically 10 mol or less of —O—$R^{g3}$ based on 1 mol of the hydroxyl group or hydrolyzable group bonding to any Si atom of the PFPE-containing silane compound (a). $R^{g3}$ has the same meaning as described above.

The cross-linking agent can contain —O—$R^{g3}$, for example, in the range from 1 to 30 mol, specifically in the range from 2 to 20 mol based on 1 mol of the hydroxyl group or hydrolyzable group bonding to any Si atom of the PFPE-containing silane compound (a).

The cross-linking agent can be included, for example, in the range from 0.1 to 30 parts by mass, specifically in the range from 0.3 to 10 parts by mass based on 100 parts by mass of the curable composition of the present invention.

(Catalyst)

The catalyst promotes hydrolysis condensation of the PFPE-containing silane compound (a) and the cross-linking agent.

The catalyst can be a metal-based catalyst, an organic acid-based catalyst, an inorganic acid-based catalyst, a base-based catalyst (for example, ammonia, triethylamine or diethylamine), or the like.

The metal-based catalyst here used is preferably a compound having alkoxide (—O—$R^h$) as a ligand.

Specific examples of the metal-based catalyst can include tetra-n-butyl titanate, tetraisopropyl titanate, titanium diisopropoxy-bis(ethylacetoacetate), tetra-n-butyl zirconate, tetra-n-propyl zirconate, dibutyltin dimethoxide and dibutyltin dilaurate.

$R^h$ in the metal-based catalyst is preferably an alkyl group having 1 to 4 carbon atoms. Such a catalyst is used to more promote a condensation reaction.

$R^h$ in the metal-based catalyst is more preferably an alkyl group having 1 to 3 carbon atoms. A catalyst having such an alkyl group is used to particularly promote a condensation reaction. The catalyst can be easily dissolved or dispersed in the curable composition and can contribute to promotion of a reaction uniformly. The catalyst can include less foreign substances and can contribute to formation of a cured product of the curable composition, having transparency.

Examples of any metal atom contained in the metal-based catalyst can include titanium, zirconium and tin. In particular, titanium or zirconium is preferably used.

Examples of a preferable metal-based catalyst can include tetraisopropyl titanate and tetra-n-propyl zirconate.

Examples of the organic acid-based catalyst can include a compound having carboxylic acid, sulfonic acid or phosphoric acid, and can specifically include acetic acid, trifluoroacetic acid, methanesulfonic acid, toluenezenesulfonic acid and alkylphosphoric acid.

Examples of the inorganic acid-based catalyst can include hydrochloric acid and sulfuric acid.

In particular, a metal-based catalyst such as tetraisopropyl titanate or tetra-n-propyl zirconate is particularly preferably used.

The curable composition of the present invention preferably includes 0.1 to 5.0 parts by mass, more preferably 0.1 to 3.0 parts by mass of the catalyst based on 100 parts by mass of the PFPE-containing silane compound (a).

The catalyst may be used singly or in combinations of two or more kinds thereof.

(Solvent)

For example, the curable composition of the present invention may include a solvent. In such a case, the curable composition can be used, with being dissolved in a proper solvent (for example, fluorine atom-containing solvent) so as to have a desired concentration depending on the application and the intended use. The concentration of the solvent may be, for example, 80 parts by mass or less, 50 parts by mass or less, 30 parts by mass or less, 20 parts by mass or less based on 100 parts by mass of the curable composition. The solvent is preferably included from the viewpoint of adjusting the viscosity of the curable composition. The solvent can be included to thereby improve the curable composition in terms of its handleability. Additionally, the solvent can be included to thereby facilitate control of the shape of a cured product formed from the curable composition, and, for example, facilitate formation of a cured product large in thickness.

Examples of the solvent include:

a fluorine atom-containing solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane ((Zeorora H (trade name) or the like), $C_4F_9OCH_3$, $C_4F_9OC_2H_5$, $CF_3CH_2OCF_2CHF_2$, $C_6F_{13}CH=CH_2$, xylene hexafluoride, perfluorobenzene, methylpentadecafluoroheptylketone, trifluoroethanol, pentafluoropropanol, hexafluoroisopropanol, $HCF_2CF_2CH_2OH$, methyltrifluoromethanesulfonate, trifluoroacetic acid, $CF_3O(CF_2CF_2O)_{m1}(CF_2O)_{n1}CF_2CF_3$, wherein m1 and n1 are each independently an integer of 0 or more and 1000 or less and the occurrence order of the respective repeating units in parentheses with m1 or n1 is not limited in the formula, provided that the sum of m1 and n1 is 1 or more, 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,3,3-trifluoro-1-propene, 1,1,1,4,4,4-hexafluoro-2-butene, ethyl perfluorobutyl ether and methyl perfluorobutyl ether. Such a solvent may be used singly or as a mixture of two or more kinds thereof.

Herein, various primers can also be used in combination in the case where the cured product obtained from the curable composition of the present invention is allowed to adhere to various base materials.

In one embodiment, for example, the curable composition of the present invention, when used, may be further diluted with a solvent and thus used, depending on the application and the intended use. Any of the fluorine-based solvents exemplified above can be used as the solvent for use in the dilution. For example, the composition may be used, with being dissolved in a solvent such as 1,3-bis(trifluoromethyl)benzene, Fluorinert (manufactured by 3M), perfluorobutyl methyl ether or perfluorobutyl ethyl ether so that a desired concentration is achieved. In particular, the solvent is preferably used in the application of thin film coating.

The curable composition of the present invention can include a compound represented by the following formula (A1), (B1), (C1) or (D1) (hereinafter, sometimes referred to as "PFPE-containing silane compound (b)").

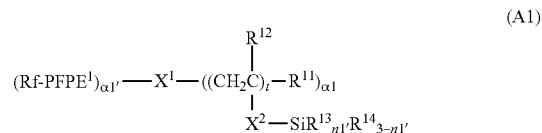

Any moiety of the descriptions of formulae (A1), (B1), (C1) and (D1), overlapped with those of (A), (B), (C) and (D), will be omitted.

In the formulae, Rf, at each occurrence, independently represents an alkyl group having 1 to 16 carbon atoms, optionally substituted with one or more fluorine atoms.

The "alkyl group having 1 to 16 carbon atoms" with respect to the alkyl group having 1 to 16 carbon atoms, the group being optionally substituted with one or more fluorine atoms, is optionally linear or branched, is preferably a linear or branched alkyl group having 1 to 6 carbon atoms, particularly 1 to 3 carbon atoms, more preferably a linear alkyl group having 1 to 3 carbon atoms.

Rf is preferably an alkyl group having 1 to 16 carbon atoms, the group being optionally substituted with one or more fluorine atoms, more preferably a $CF_2H$—$C_{1-15}$ fluoroalkylene group or a $C_{1-16}$ perfluoroalkyl group, further preferably a $C_{1-16}$ perfluoroalkyl group.

The perfluoroalkyl group having 1 to 16 carbon atoms may be linear or branched, and is preferably a linear or branched perfluoroalkyl group having 1 to 6 carbon atoms, in particular, 1 to 3 carbon atoms, more preferably a linear perfluoroalkyl group having 1 to 3 carbon atoms, specifically —$CF_3$, —$CF_2CF_3$, or —$CF_2CF_2CF_3$.

In formula (A1), $\alpha 1$ is an integer of 1 to 9 and $\alpha 1'$ is an integer of 1 to 9. Here, $\alpha 1'$ may be varied depending on the valence of $X^1$. In formula (A1), the sum of $\alpha 1$ and $\alpha 1'$ is the same as the valence of $X^1$. For example, in the case where $X^1$ is a decavalent organic group, the sum of $\alpha 1$ and $\alpha 1'$ is 10, for example, $\alpha 1$ can be 9 and $\alpha 1'$ can be 1, $\alpha 1$ can be 5 and $\alpha 1'$ can be 5, or $\alpha 1$ can be 1 and $\alpha 1'$ can be 9. In the case where $X^1$ is a divalent organic group, $\alpha 1$ and $\alpha 1'$ are 1. In formula (A1), in the case where $X^1$ is a single bond, $\alpha 1$ and $\alpha 1'$ are 1.

$X^1$ is preferably a di- to heptavalent, more preferably di- to tetravalent, further preferably divalent organic group.

In one embodiment, $X^1$ is a di- to tetravalent organic group, $\alpha 1$ is 1 to 3, and $\alpha 1'$ is 1.

In another embodiment, $X^1$ is a divalent organic group, $\alpha 1$ is 1, and $\alpha 1'$ is 1.

In formula (A1), n1' with respect to a (—$SiR^{13}_{n1'}R^{14}_{3-n1'}$) unit is independently an integer of 0 to 3, preferably 1 to 3, more preferably 3. In the formula, at least one n1' is an integer of 1 to 3, namely, there is not any case where all n1'(s) are simultaneously 0. In other words, at least one $R^{13}$ is present in formula (A1).

In formula (B1), $\beta 1$ is an integer of 1 to 9 and $\beta 1'$ is an integer of 1 to 9. Such $\beta 1$ and $\beta 1'$ may be varied depending on the valence of X. In formula (B1), the sum of β1 and β1' is the same as the valence of, $X^3$. For example, in the case where $X^3$ is a decavalent organic group, the sum of β1 and β1' is 10, for example, β1 can be 9 and β1' can be 1, β1 can be 5 and β1' can be 5, or β1 can be 1 and β1' can be 9. In the case where $X^3$ is a divalent organic group, β1 and β1' are 1. In formula (B1), in the case where X is a single bond, β1 and β'1 are 1.

$X^3$ is preferably a di- to heptavalent, more preferably di- to tetravalent, further preferably divalent organic group.

In one embodiment, $X^3$ is a di- to tetravalent organic group, β1 is 1 to 3, and β1' is 1.

In another embodiment, $X^3$ is a divalent organic group, β1 is 1, and β1' is 1.

In formula (B1), n1' has the same meaning as described with respect to (A1).

In formula (C), γ1 is an integer of 1 to 9 and γ1' is an integer of 1 to 9. Such γ1 and 11' may be varied depending on the valence of $X^5$. In formula (C1), the sum of γ1 and γ1' is the same as the valence of $X^5$. For example, in the case where $X^5$ is a decavalent organic group, the sum of γ1 and γ1' is 10, for example, γ1 can be 9 and γ1' can be 1, γ1 can be 5 and γ1' can be 5, or γ1 can be 1 and γ1' can be 9. In the case where $X^5$ is a divalent organic group, γ1 and γ1' are 1. In formula (C1), in the case where $X^5$ is a single bond, γ1 and γ'1 are 1.

$X^5$ is preferably a di- to heptavalent, more preferably di- to tetravalent, further preferably divalent organic group.

In one embodiment, $X^5$ is a di- to tetravalent organic group, γ1 is 1 to 3, and γ1' is 1.

In another embodiment, $X^5$ is a divalent organic group, γ1 is 1, and γ1' is 1.

In formula (D1), δ1 is an integer of 1 to 9 and δ1' is an integer of 1 to 9. Such δ1 and δ1' may be varied depending on the valence of $X^7$. In formula (D1), the sum of δ1 and δ1' is the same as the valence of X. For example, in the case where $X^7$ is a decavalent organic group, the sum of δ1 and δ1' is 10, for example, δ1 can be 9 and δ1' can be 1, δ1 can be 5 and δ1' can be 5, or δ1 can be 1 and δ1' can be 9. In the case where $X^7$ is a divalent organic group, δ1 and δ1' are 1. In formula (D1), in the case where $X^7$ is a single bond, δ1 and δ'1 are 1.

$X^7$ is preferably a di- to heptavalent, more preferably di- to tetravalent, further preferably divalent organic group.

In one embodiment, $X^7$ is a di- to tetravalent organic group, δ1 is 1 to 3, and δ1' is 1.

In another embodiment, $X^7$ is a divalent organic group, δ1 is 1, and δ1' is 1.

In one embodiment, the PEPE-containing silane compound (b) can be a compound represented by formula (A1), (C1) or (D1). Such a silane compound can be used to thereby allow adhesion properties to the base material to be enhanced.

In one embodiment, the PFPE-containing silane compound (b) has two or more, preferably three or more Si atoms each having a hydroxyl group or a hydrolyzable group at an end.

In one embodiment, the curable composition of the present invention includes 0.1% by mol or more and 35% by mol or less of any compound represented by formulae (A1), (B1), (C1) and (D1) based on the total of any compound represented by formulae (A), (B), (C) and (D) (hereinafter, also referred to as "component (1)") and any compound represented by formulae (A1), (B1), (C1) and (D1) (hereinafter, also referred to as "component (2)"). The lower limit of the content of any compound represented by formulae (A1), (B1), (C1) and (D1) based on the total of the component (1) and the component (2) can be preferably 0.1% by mol, more preferably 0.2% by mol, further preferably 0.5% by mol, still more preferably 1% by mol, particularly preferably 2% by mol, particularly 5% by mol. The upper limit of the content of any compound represented by formulae (A1), (B1), (C1) and (D1) based on the total of the component (1) and the component (2) can be preferably 35% by mol, more preferably 30% by mol, further preferably 20% by mol, still more preferably 15% by mol or 10% by mol. The content of any compound represented by formulae (A1), (B1), (C1) and (D1) based on the total of the component (1) and the component (2) is preferably 0.1% by mol or more and 30% by mol or less, more preferably 0.1% by mol or more and 20% by mol or less, further preferably 0.2% by mol or more and 10% by mol or less, still more preferably 0.5% by mol or more and 10% by mol or less, particularly preferably 1% by mol or more and 10% by mol or less, for example, 2% by mol or more and 10% by mol or less or 5% by mol or more and 10% by mol or less. The contents of the component (1) and the component (2) can be in such ranges, thereby allowing the curable composition of the present invention to contribute to formation of a cured product favorable in friction durability.

The combination of the component (1) and the component (2) in the curable composition is preferably a combination of a compound represented by formula (A) and a compound represented by formula (A1), a combination of a compound represented by formula (B) and a compound represented by formula (B1), a combination of a compound represented by formula (C) and a compound represented by formula (C1), or a combination of a compound represented by formula (D) and a compound represented by formula (D1).

In such any compound represented by formula (A) and formula (A1), t is preferably 2 or more, more preferably an integer of 2 to 10, further preferably an integer of 2 to 6. Here, t can be 2 or more, thereby allowing a plurality of Si atoms each having $R^{13}$ or $R^{13''}$ to be present and allowing a cured product formed from the curable composition of the present invention to achieve higher durability (for example, friction durability).

In such any compound represented by formula (C) and formula (C1), k1 is preferably 2 or 3, more preferably 3.

In a preferable embodiment, the compound represented by formula (C) has a structure represented by $-Si-(Z^3-SiR^{72}_3)_2$, $-Si-(Z^3-SiR^{72''}_3)_2$, $-Si-(Z^3-SiR^{72}_3)_3$ or $-Si-(Z^3-SiR^{72''}_3)_3$, further preferably has a structure represented by $-Si-(Z^3-SiR^{72}_3)_3$ or $-Si-(Z^3-SiR^{72''}_3)_3$ at an end; the compound represented by formula (C1) has a structure represented by $-Si-(Z^3-SiR^{72}_3)_2$ or $-Si-(Z^3-SiR^{72}_3)_3$, further preferably has a structure represented by $-Si-(Z^3-SiR^{72}_3)_3$ at an end. Such a structure can be at an end, thereby allowing a cured product formed from the curable composition of the present invention to achieve higher durability (for example, friction durability).

Specific examples of the group represented by $-Si-(Z^3-SiR^{72}_3)_2$ or $-Si-(Z^3-SiR^{72''}_3)_2$ can include $-Si-R^a_2R^b_{l1}R^c_{m1}$ wherein $R^a$ is a group represented by $-Z^3-SiR^{72}_3$, and the total of l1 and m1 is 1, $-Si-R^{a''}_2R^{b''}_{l1}R^c_{m1}$ wherein $R^{a''}$ is a group represented by $-Z^3-SiR^{72''}_3$, and the total of l1 and m1 is 1, $-Si-R^{71}_2R^{72}_{q1}R^{73}_{r1}$ wherein $R^{71}$ is a group represented by $-Z^3-SiR^{72}_3$, and the total of q1 and r1 is 1, or $-Si-R^{71}_2R^{72''}_{q1}R^{73}_{r1}$ wherein $R^{71}$ is a group represented by $-Z^3-SiR^{72}_3$, and the total of q1 and r1 is 1.

In such any compound represented by formula (D) and formula (D1), 12 is preferably 2 or 3, more preferably 3.

In a preferable embodiment, the compound represented by formula (D) has a —C—(Y—SiR$^{85''}_3$)$_2$, —C—(Y—SiR$^{85''}_3$)$_2$ (specifically, —C—(Y—SiR$^{85}_3$)$_2$R$^{83}$, —C—(Y—SiR$^{85''}_3$)$_2$R$^{83}$), —C—(Y—SiR$^{85}$)$_3$ or —C—(Y—SiR$^{85''}$)$_3$ structure, further preferably a —C—(Y—SiR$^{85}$)$_3$ or —C—(Y—SiR$^{85''}$)$_3$ structure at an end; and the compound represented by formula (D1) has a —C—(Y—SiR$^{89}_3$)$_2$ (specifically, —C—(Y—SiR$^{85}_3$)$_2$R$^{83}$) or —C—(Y—SiR$^{85}$)$_3$ structure, further preferably a —C—(Y—SiR$^{85}$)$_3$ structure at an end. Such a structure can be at an end, thereby allowing the curable composition of the present invention to contribute to formation of a cured product having higher durability (for example, friction durability).

(Other Component)

The curable composition of the present invention may further include other component. Such other component is not limited, and may include, for example, a (non-reactive) fluoropolyether compound which can be understood as a fluorine-containing oil, preferably a perfluoro(poly)ether compound (hereinafter, referred to as "fluorine-containing oil"), a stabilizing material (dehydrating agent, molecular sieve, magnesium sulfate or methyl o-formate), a viscosity modifier, a filler, a fluorescent agent, a storage stabilizer, a filling agent, a colorant, a heat resistance improver, a cold resistance improver, a rust inhibitor, an adhesiveness improver, and/or a liquid strengthening agent.

The fluorine-containing oil is not limited, and examples thereof include a compound (perfluoro(poly)ether compound) represented by the following general formula (III):

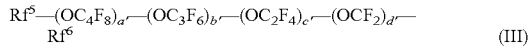

$$Rf^5—(OC_4F_8)_{a'}—(OC_3F_6)_{b'}—(OC_2F_4)_{c'}—(OCF_2)_{d'}—Rf^6 \quad (III)$$

wherein Rf$^5$ represents an alkyl group having 1 to 16 carbon atoms optionally substituted with one or more fluorine atoms (preferably C$_{1-16}$ perfluoroalkyl group), Rf$^6$ represents an alkyl group having 1 to 16 carbon atoms optionally substituted with one or more fluorine atoms (preferably C$_{1-16}$ perfluoroalkyl group), a fluorine atom or a hydrogen atom, and Rf$^5$ and Rf$^6$ are more preferably, each independently, a C$_{1-3}$ perfluoroalkyl group; and a', b', c' and d' represent the respective four numbers of repeating units in perfluoro(poly)ether constituting a main backbone of the polymer and are mutually independently an integer of 0 or more and 300 or less, the sum of a', b', c' and d' is at least 1, preferably 1 to 300, more preferably 20 to 300, the occurrence order of the respective repeating units in parentheses with the subscript a', b', c' or d' is not limited in the formula, and, among such repeating units, —(OC$_4$F$_8$)— may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, and is preferably —(OCF$_2$CF$_2$CF$_2$CF$_2$)—, and —(OC$_3$F$_6$)— may be any of —(OCF$_2$CF$_2$CF$_2$)—, —(OCF(CF$_3$)CF$_2$)— and —(OCF$_2$CF (CF$_3$))—, and is preferably —(OCF$_2$CF$_2$CF$_2$)—, and, for example, —(OC$_2$F$_4$)— may be any of —(OCF$_2$CF$_2$)— and —(OCF(CF$_3$))—, and is preferably —(OCF$_2$CF$_2$)—.

Examples of the perfluoro(poly)ether compound represented by general formula (III) include a compound represented by any of the following general formulae (IIIa) and (IIIb) (which may be adopted singly or as a mixture of two or more kinds thereof).

$$Rf^5—(OCF_2CF_2CF)_{b''}—Rf^6 \quad (IIIa)$$

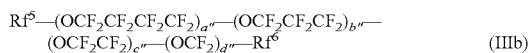

$$Rf^5—(OCF_2CF_2CF_2CF_2)_{a''}—(OCF_2CF_2CF_2)_{b''}—(OCF_2CF_2)_{c''}—(OCF_2)_{d''}—Rf^6 \quad (IIIb)$$

In such formulae, Rf$^5$ and Rf$^6$ are as described above; in formula (IIIa), b'' is an integer of 1 or more and 100 or less; in formula (IIIb), a'' and b'' are each independently an integer of 1 or more and 30 or less, and c'' and d'' are each independently an integer of 1 or more and 300 or less, and the occurrence order of the respective repeating units in parentheses with subscript a'', b'', c'', d'' is not limited in the formulae.

The fluorine-containing oil may have a number average molecular weight of 1,000 to 30,000. In particular, the number average molecular weight of the compound represented by formula (IIIa) is preferably 2,000 to 8,000. In one embodiment, the number average molecular weight of the compound represented by formula (IIIb) is 3,000 to 8,000. In another embodiment, the number average molecular weight of the compound represented by formula (IIIb) is 8,000 to 30,000.

The curable composition can contain, for example, 0 to 500 parts by mass, preferably 0 to 100 parts by mass, more preferably 1 to 50 parts by mass, further preferably 1 to 5 parts by mass of the fluorine-containing oil based on 100 parts by mass of the PFPE-containing silane compound (a).

The fluorine-containing oil may be a compound represented by general formula Rf'—F, wherein Rf' is C$_{5-16}$ perfluoroalkyl group, from another viewpoint. The fluorine-containing oil may be a chlorotrifluoroethylene oligomer. The compound represented by Rf'—F and the chlorotrifluoroethylene oligomer are preferable in that high affinity with the perfluoro(poly)ether group-containing silane compound where Rf is a C$_{1-16}$ perfluoroalkyl group is obtained.

The curable composition of the present invention can include such a fluorine-containing oil to be thereby formed into a more flexible curing composition.

In one embodiment, the average molecular weight of the fluorine-containing oil may be higher than the average molecular weight of the PFPE-containing silane compound (a) (for example, a compound represented by formula (A), (B), (C), or (D)). Such an average molecular weight can be set, thereby allowing a cured product formed by using the curable composition of the present invention to achieve more excellent friction durability and surface lubricity.

In one embodiment, the average molecular weight of the fluorine-containing oil may be lower than the average molecular weight of the PFPE-containing silane compound (a) (for example, a compound represented by formula (A), (B), (C) or (D)). Such an average molecular weight can be set, thereby allowing the curable composition of the present invention to not only be inhibited from being reduced in transparency of a cured product formed by using the curable composition, but also contribute to formation of a cured product having high friction durability and high surface lubricity.

Examples of the storage stabilizer can include methyltrimethoxysilane, methyltripropenoxysilane, vinyltributanoximesilane and methyltriacetoxysilane.

Examples of the filling agent can include fibrous filling agents such as asbestos, glass fiber and an organic fiber.

Examples of the colorant can include a pigment and a dye.

Examples of the heat resistance improver can include colcothar and cerium oxide.

Examples of the adhesiveness improver can include β-(3,4-epoxycyclohexyl)ethyltrimethoxysilane, γ-glycidoxypropyltriethoxysilane, γ-methacryloxypropyltrimethoxysilane, γ-methacryloxypropylmethyldiethoxysilane, N-β-(aminoethyl)-γ-aminopropyltrimethoxysilane, γ-aminopropyltriethoxysilane, γ-chloropropyltrimethoxysilane, γ-mercaptopropyltrimethoxysilane and γ-isocyanatopropyltriethoxysilane.

Examples of the liquid strengthening agent can include reticular polysiloxane having a triorganosiloxy unit and a $SiO_2$ unit.

An adhesion promoter such as carboxylic anhydride or pyromellitic acid tetraallyl ester can be further added to the curable composition of the present invention.

For example, such a curable composition may be configured as a one-liquid type composition or may be configured as a two-liquid type composition where both these components are mixed in use, depending on the application.

(Application)

A cured product of the curable composition of the present invention can be used in, for example, a potting material or a sealing material. A cured product of the curable composition of the present invention can be used by, for example, filling any void (for example, a bonding section of a housing and a printed board, or a space between a metal terminal section and a mold resin subjected to resin-molding) of an electronic member with the cured product, and drying the resultant after such filling.

In order that a cured product (for example, a potting material or a sealing material) having higher abrasion resistance is formed, an object to be treated is preferably washed with acetone, hydrofluoroether or the like and thereafter dried for removal of an oily content on the wall of any void, before the treatment with the curable composition of the present invention. The object can be further subjected to a pre-treatment with UV ozone, oxygen plasma or the like, in addition to the washing, thereby allowing abrasion resistance of the cured product to be more enhanced.

A primer treatment can be, if necessary, applied onto, the wall of any void before the treatment with the curable composition of the present invention, thereby enhancing adhesiveness of a potting material formed from the curable composition and more enhancing abrasion resistance. For example, the primer treatment may be performed in the same conditions as those of a primer treatment with a silane coupling agent, according to an ordinary method.

Herein, various primers can also be used in combination in the case where the cured product obtained from the curable composition of the present invention is allowed to adhere to various base materials.

The temperature in the treatment is not limited, and the treatment may be usually performed at room temperature. The treatment time is also not limited, and can be, for example, 5 minutes to 1 hour.

In one embodiment, the curable composition can be cured at room temperature. The curable composition is particularly useful as a composition for formation of a potting material.

In one embodiment, the curable composition of the present invention, when used, may be further diluted with a solvent and thus used, depending on the application and the intended use. Any of the fluorine-based solvents exemplified above can be used as the solvent for use in the dilution. For example, the composition may be used, with being dissolved in a solvent such as 1,3-bis(trifluoromethyl)benzene, Fluorinert (manufactured by 3M), perfluorobutyl methyl ether or perfluorobutyl ethyl ether so that a desired concentration is achieved. In particular, the solvent is preferably used in the application of thin film coating.

The curable composition of the present invention enables a cured product having favorable adhesiveness to a metal or a plastic base material to be formed, and thus can be useful particularly as an adhesive to be applied to peripherals of electrical and electronic components and peripherals of in-car members. The curable composition of the present invention has a favorable elastic modulus particularly even at a low temperature, and thus can be usefully used in, for example, an automobile member (for example, a sealing material, specifically, a gasket), particularly an automobile member usable in a cool region (for example, −50° C. or less).

A cured product of the curable composition of the present invention is favorable in chemical resistance, acid resistance and base resistance. Such a cured product of the curable composition of the present invention can also be used in a chemical plant, semiconductor manufacturing equipment or the like.

The glass transition temperature of a cured product of the curable composition of the present invention can be a relatively low value. The reason for this is because the curable composition of the present invention includes the compound having the $PFPE^1$. The curable composition of the present invention can be used in any application where the composition is used at a relatively low temperature, for example, an automobile member (for example, a sealing material, specifically, a gasket), particularly an automobile member usable in a cool region (for example, −50° C. or less).

A cured product of the curable composition of the present invention can be inhibited from being increased in elastic modulus at a low temperature. A cured product of the curable composition of the present invention can be inhibited from being increased in, for example, the ratio of the elastic modulus at −50° C. to the elastic modulus at 0° C. The curable composition of the present invention can be used in any application where rubber properties are demanded even at a relatively low temperature, for example, an automobile member (for example, a sealing material, specifically, a gasket), particularly, an automobile member usable in a cool region (for example, −50° C. or less), a sealing material for semiconductor equipment, or the like.

The temperature of 1% decomposition of a cured product of the curable composition of the present invention can be, for example, the same temperature as the temperature of 1% decomposition of a cured product of a composition including a silane compound having $(OCF_2CF(CF_3))_mOCF_2CF_2O(CF(CF_3)CF_2O)_n$ as a perfluoro(poly)ether group. Accordingly, the curable composition of the present invention can be used at a relatively high temperature.

EXAMPLES

The present invention is more specifically described with reference to the following Examples, but is not intended to be limited to such Examples. The occurrence order of repeating units constituting perfluoro(poly)ether is not limited in the present Examples.

Example 1

Preparation of Curable Composition

Perfluoropolyether compound (A), tetraethoxysilane as a cross-linking agent, and tetraisopropaxy titanium as a curing catalyst were weighed in a glass vessel for mixing in amounts of 100 parts by weight, 1 part by weight, and 0.5 parts by weight, respectively, and stirred with a magnetic stirrer, to prepare a curable composition.

Perfluoropolyether Compound (A)

$(C_2H_5O)_3SiCH_2CH_2CH_2NHCOCF_2(OC_2F_4)_6—(OCF_2)_f—CF_2CONHCH_2CH_2CH_2Si(OC_2H_5)_3$ wherein e=48, f=37, and e/f=1.3

The curable composition prepared in Example 1 was poured into a mold produced by polytetrafluoroethylene (PTFE), and left to still stand at room temperature for 24 hours and thus cured, to produce a test piece of 5 mm×200 mm, having a thickness of 0.2 mm.

Comparative Example 1

A curable composition was prepared in the same manner as in Example 1 except that the following perfluoropolyether compound (B) was used instead of perfluoropolyether compound (A).

Perfluoropolyether Compound (B) $(C_2H_5O)_3SiCH_2CH_2CH_2NHCOCF_2(OCF_2CF(CF_3))_mOCF_2CF_2O(CF(CF_3)CF_2O)_n$—$CF_2CONHCH_2CH_2CH_2Si(OC_2H_5)_3$
wherein m+n=54

The curable composition prepared in Comparative Example 1 was cured in the same manner as in Example 1, to produce a test piece.

Evaluation of Dynamic Viscoelasticity

Each of the test pieces obtained in Example 1 and Comparative Example 1 was subjected to dynamic viscoelasticity measurement with a tension-type viscoelasticity measuring system (DMA).

Specifically, liquid nitrogen was used for cooling and the measurement was performed at a frequency of 10 Hz and at a temperature-increasing rate of 2° C./min in the measurement temperature range from −140 to 50° C. The resulting storage elastic modulus was used to calculate the ratio of the elastic modulus at −50° C. to the storage elastic modulus at 0° C. (Elastic modulus at −50° C./Elastic modulus at 0° C.). The resulting storage elastic modulus plot was used to calculate the glass transition temperature (Tg). The results are shown in Table 1.

The "Elastic modulus ratio" in Table 1 represents "Elastic modulus at −50° C./Elastic modulus at 0° C.".

TABLE 1

|  | Tg (° C.) | Elastic modulus ratio |
|---|---|---|
| Example 1 | −105 | 2.1 |
| Comparative Example 1 | −71 | 4.2 |

Comparative Example 2

A curable composition was prepared in the same manner as in Example 1 except that the following perfluoropolyether compound (C) was used instead of perfluoropolyether compound (A).

Perfluoropolyether Compound (C)
$(C_2H_5O)_3SiCH_2CH_2CH_2NHCOCF_2(OC_2F_4)_e$—$(OCF_2)_f$—$CF_2CONHCH_2CH_2CH_2Si(OC_2H_5)_3$
wherein e=40, f=58, and e/f=0.7

The resulting curable composition was cured in the same manner as in Example 1, to form a test piece.

The resulting test piece had a Tg of −125° C.

Thermogravimetric/Differential Thermal Analysis

The temperature of 1% decomposition of each of the curable compositions obtained in Example 1 and Comparative Examples 1 and 2 was measured with a thermogravimetric/differential thermal analyzer (TG/DTA).

Specifically, 10 mg of a cured product was weighed in an aluminum pan and such measurement was performed with an aluminum oxide powder (Al$_2$O) as a reference in the measurement temperature range from 25 to 600° C. at a temperature-increasing rate of 10° C./min under an air atmosphere. The temperature at which the weight was decreased by 1% based on 10 mg of the cured product weighed was defined as the temperature of 1% decomposition. The results are shown in Table 2.

TABLE 2

|  | Temperature of 1% decomposition (° C.) |
|---|---|
| Example 1 | 294 |
| Comparative Example 1 | 308 |
| Comparative Example 2 | 220 |

It was found as shown in Table 1 that the cured product of the curable composition obtained in Example 1 had a low Tg and could keep rubber properties even at a low temperature. It was further found that the cured product of the curable composition obtained in Example 1 was low in elastic modulus ratio and was suitable for use at a low temperature such as −50° C.

The cured product of the curable composition obtained in Example 1 had a linear PFPE structure and satisfied an e/f ratio of 1.0 or more. It was found that such a cured product of the curable composition of Example 1 not only was suitable for use at a low temperature, but also suitable for use at a high temperature, because as shown in Table 2, the temperature of 1% decomposition in Example 1 was same as that of the cured product of the curable composition of Comparative Example 1. The curable composition of Comparative Example 1 did not satisfy an e/f ratio of 1.0 or more while having a branched structure withstanding at a high temperature.

INDUSTRIAL APPLICABILITY

The present invention can be suitably utilized for forming a fluorine-containing sealing material for embedding any void (for example, a void at a display edge) of a display or between electronic members such as a printed board in electronic equipment. The present invention can be suitably used in an application where it is used at a relatively low temperature, for example, a sealing material for semiconductor equipment, or an automobile member (for example, a sealing material, specifically, a gasket), particularly, an automobile member usable in a cool region (for example, −50° C. or less).

The present invention includes following embodiments:

Embodiment 1

A curable composition comprising:
a perfluoro(poly)ether group-containing silane compound which is a compound having two or more Si atoms each bonding to at least one group selected from the group consisting of a hydroxyl group and a hydrolyzable group, and a perfluoro(poly)ether group, wherein
the perfluoro(poly)ether group is a group represented by formula:

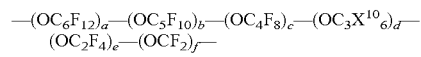

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.0 or more, and each $X^{10}$, at each occurrence, is independently a hydrogen atom, a fluorine atom or a chlorine atom;

an organosilicon compound having at least two —O—$R^{g3}$(s) each bonding to a Si atom, wherein each $R^{g3}$, at each occurrence, is independently a hydrogen atom or a monovalent organic group; and a catalyst.

Embodiment 2

The curable composition according to Embodiment 1, wherein the perfluoro(poly)ether group-containing silane compound is at least one perfluoro(poly)ether group-containing silane compound represented by formula (A), (B), (C) or (D):

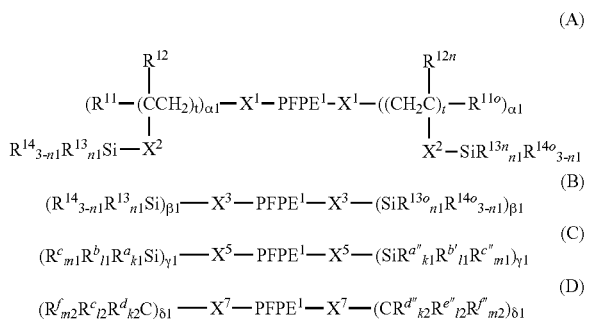

(A)

(B) $(R^{14}{}_{3-n1}R^{13}{}_{n1}Si)_{\beta1}\!\!-\!\!X^3\!-\!PFPE^1\!-\!X^3\!-\!(SiR^{13o}{}_{n1}R^{14o}{}_{3-n1})_{\beta1}$ (C) $(R^c{}_{m1}R^b{}_{l1}R^a{}_{k1}Si)_{\gamma1}\!\!-\!\!X^5\!-\!PFPE^1\!-\!X^5\!-\!(SiR^{a''}{}_{k1}R^{b'}{}_{l1}R^{c''}{}_{m1})_{\gamma1}$ (D) $(R^f{}_{m2}R^c{}_{l2}R^d{}_{k2}C)_{\delta1}\!\!-\!\!X^7\!-\!PFPE^1\!-\!X^7\!-\!(CR^{d''}{}_{k2}R^{e''}{}_{l2}R^{f''}{}_{m2})_{\delta1}$ wherein:

each $PFPE^1$, at each occurrence, is independently a group represented by formula:

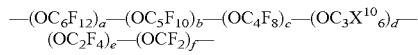

wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.0 or more, and each $X^{10}$, at each occurrence, is independently a hydrogen atom, a fluorine atom or a chlorine atom;

each $R^{13}$, at each occurrence, independently represents a hydroxyl group or a hydrolyzable group;

each $R^{14}$, at each occurrence, independently represents a hydrogen atom or an alkyl group having 1 to 22 carbon atoms;

each $R^{11}$, at each occurrence, independently represents a hydrogen atom or a halogen atom;

each $R^{12}$, at each occurrence, independently represents a hydrogen atom or a lower alkyl group;

$R^{11''}$, $R^{12''}$, $R^{13''}$ and $R^{14''}$ have the same meanings as $R^{11}$, $R^{12}$, $R^{13}$ and $R^{14}$, respectively;

n1 with respect to each ($-SiR^{13}{}_{n1}R^{14}{}_{3-n1}$) unit or each ($-SiR^{13''}{}_{n1}R^{14''}{}_{3-n1}$) unit is independently an integer of 0 to 3;

provided that at least two groups selected from the group consisting of $R^{13}$ and $R^{13''}$, at each occurrence, are each independently present in formulae (A) and (B);

each $X^1$, at each occurrence, independently represents a single bond or a di- to decavalent organic group;

each $X^2$, at each occurrence, independently represents a single bond or a divalent organic group;

each t, at each occurrence, is independently an integer of 1 to 10;

each α1, at each occurrence, is independently an integer of 1 to 9;

each $X^3$, at each occurrence, independently represents a single bond or a di- to decavalent organic group;

each β1, at each occurrence, is independently an integer of 1 to 9;

each $X^5$, at each occurrence, independently represents a single bond or a di- to decavalent organic group;

each γ1, at each occurrence, is independently an integer of 1 to 9;

each $R^a$, at each occurrence, independently represents $-Z^3-SiR^{71}{}_{p1}R^{72}{}_{q1}R^{73}{}_{r1}$;

each $Z^3$, at each occurrence, independently represents an oxygen atom or a divalent organic group;

each $R^{71}$, at each occurrence, independently represents $R^{a'}$;

$R^{a'}$ has the same meanings as $R^a$;

the number of Si linearly linked via a $Z^3$ group in $R^a$ is at most 5;

each $R^{72}$, at each occurrence, independently represents a hydroxyl group or a hydrolyzable group;

each $R^{73}$, at each occurrence, independently represents a hydrogen atom or a lower alkyl group;

each p1, at each occurrence, is independently an integer of 0 to 3;

each q1, at each occurrence, is independently an integer of 0 to 3;

each r1, at each occurrence, is independently an integer of 0 to 3;

each $R^{a''}$, at each occurrence, independently represents $-Z^3-SiR^{71}{}_{p1}R^{72''}{}_{q1}R^{73}{}_{r1}$;

$R^{72''}$ has the same meanings as $R^{72}$;

provided that the sum of p1, q1 and r1 with respect to ($-Z^3-SiR^{71}{}_{p1}R^{72}{}_{q1}R^{73}{}_{r1}$) or ($-Z^3-SiR^{71}{}_{p1}R^{72''}{}_{q1}R^{73}{}_{r1}$) is 3 and at least one q1 in formula (C) is an integer of 1 to 3;

each $R^b$, at each occurrence, independently represents a hydroxyl group or a hydrolyzable group;

each $R^c$, at each occurrence, independently represents a hydrogen atom or a lower alkyl group;

$R^{b''}$ and $R^{c''}$ have the same meanings as $R^b$ and $R^c$, respectively;

each k1, at each occurrence, is independently an integer of 0 to 3;

each l1, at each occurrence, is independently an integer of 0 to 3;

each m1, at each occurrence, is independently an integer of 0 to 3;

provided that the sum of k1, l1 and m1 with respect to each ($SiR^a{}_{k1}R^b{}_{l1}R^c{}_{m1}$) or each ($SiR^{a''}{}_{k1}R^{b''}{}_{l1}R^{c''}{}_{m1}$) is 3;

at least two groups selected from the group consisting of $R^b$, $R^{b''}$, $R^{72}$ and $R^{72''}$ are present in (C);

each $X^7$ independently represents a single bond or a di- to decavalent organic group;

each δ1 is independently an integer of 1 to 9;

each $R^d$, at each occurrence, independently represents $-Z^4-CR^{81}{}_{p2}R^{82}{}_{q2}R^{83}{}_{r2}$;

each $Z^4$, at each occurrence, independently represents an oxygen atom or a divalent organic group;

each $R^{81}$, at each occurrence, independently represents $R^{d'}$;

$R^{d'}$ has the same meanings as $R^d$;

the number of C linearly linked via a $Z^4$ group in $R^d$ is at most 5;

each $R^{82}$, at each occurrence, independently represents —Y—SiR$^{85}_{n2}$R$^{86}_{3-n2}$;

each Y, at each occurrence, independently represents a divalent organic group;

each $R^{85}$, at each occurrence, independently represents a hydroxyl group or a hydrolyzable group;

each $R^{86}$, at each occurrence, independently represents a hydrogen atom or a lower alkyl group;

each $R^{83}$, at each occurrence, independently represents a hydrogen atom or a lower alkyl group;

each p2, at each occurrence, is independently an integer of 0 to 3;

each q2, at each occurrence, is independently an integer of 0 to 3;

each r2, at each occurrence, is independently an integer of 0 to 3;

each $R^{d''}$, at each occurrence, independently represents —$Z^4$—CR$^{81}_{p2}$R$^{82''}_{q2}$R$^{83}_{r2}$;

$R^{82''}$ represents —Y—SiR$^{85''}_{n2}$R$^{86''}_{3-n2}$;

provided that the sum of p2, q2 and r2 with respect to (—$Z^4$—CR$^{81}_{p2}$R$^{82}_{q2}$R$^{83}_{r2}$) or (—$Z^4$—CR$^{81}_{p2}$R$^{82''}_{q2}$R$^{83}_{r2}$) is 3;

n2 with respect to a (—Y—SiR$^{85}_{n2}$R$^{86}_{3-n2}$) unit or a (—Y—SiR$^{85''}_{n2}$R$^{86''}_{3-n2}$) unit independently represents an integer of 0 to 3;

$R^{85''}$ and $R^{86''}$ have the same meanings as $R^{85}$ and $R^{86}$, respectively;

each $R^e$, at each occurrence, independently represents —Y—SiR$^{85}_{n2}$R$^{86}_{3-n2}$;

each $R^{e''}$, at each occurrence, independently represents —Y—SiR$^{85''}_{n2}$R$^{86''}_{3-n2}$;

each $R^f$, at each occurrence, independently represents a hydrogen atom, a hydroxyl group or a lower alkyl group;

$R^{f''}$ has the same meanings as $R^f$;

each k2, at each occurrence, is independently an integer of 0 to 3;

each l2, at each occurrence, is independently an integer of 0 to 3; and each m2, at each occurrence, is independently an integer of 0 to 3;

provided that the sum of k2, l2 and m2 with respect to (CR$^d_{k2}$R$^e_{l2}$R$^f_{m2}$) or (CR$^{d''}_{k2}$R$^{e''}_{l2}$R$^{f''}_{m2}$) is 3, and two or more groups selected from the group consisting of a group represented by —Y—SiR$^{85}_{n2}$R$^{86}_{3-n2}$ wherein n2 is 1 or more and a group represented by —Y—SiR$^{85''}_{n2}$R$^{86''}_{3-n2}$ wherein n2 is 1 or more are present in formula (D).

Embodiment 3

The curable composition according to Embodiments 1 or 2, wherein such a Si atom bonding to at least one group selected from the group consisting of a hydroxyl group and a hydrolyzable group is present at each of both ends of a molecular backbone of the perfluoro(poly)ether group-containing silane compound.

Embodiment 4

The curable composition according to any one of Embodiments 1 to 3, wherein the catalyst is at least one selected from the group consisting of a metal-based catalyst, an organic acid-based catalyst, an inorganic acid-based catalyst and a basic catalyst.

Embodiment 5

The curable composition according to any one of Embodiments 1 to 4, wherein the catalyst is a metal-based catalyst comprising a titanium atom, a zirconium atom or a tin atom.

Embodiment 6

The curable composition according to any one of Embodiments 1 to 5, comprising 0.1 to 5.0 parts by mass of the catalyst based on 100 parts by mass of the perfluoro(poly) ether group-containing silane compound.

Embodiment 7

The curable composition according to any one of Embodiments 1 to 6, wherein the organosilicon compound comprises an organosilicon compound represented by any of the following formulae (E1) to (E5):

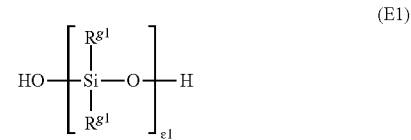
(E1)

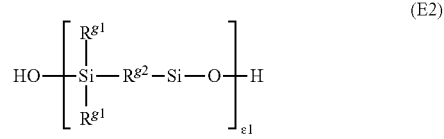
(E2)

(E3)

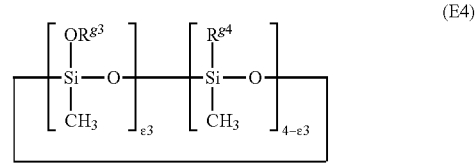
(E4)

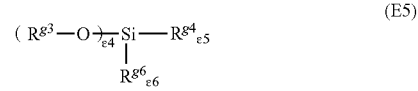
(E5)

wherein:

each $R^{g1}$, at each occurrence, is independently a substituted or unsubstituted monovalent hydrocarbon group having 1 to 8 carbon atoms;

each $R^{g2}$, at each occurrence, is independently substituted or unsubstituted and has 1 to 20 carbon atoms;

each $R^{g3}$, at each occurrence, is independently a hydrogen atom or a monovalent organic group;

each $R^{g4}$, at each occurrence, is independently a monovalent organic group;

$R^{g6}$ represents $R^{g8}$—$R^{g7}$—;

each $R^{g7}$, at each occurrence, independently represents a single bond, an oxygen atom or a divalent organic group;

each $R^{g8}$, at each occurrence, is independently an amino group, an epoxy group, a methacrylic group, a vinyl group or a mercapto group;

each ε1, at each occurrence, is independently an integer of 1 or more;

each ε2, at occurrence, is independently 2 or 3;

each ε3, at each occurrence, is independently 2 or 3;

ε4 is an integer of 2 or more;

ε5 is 1 or 2; and

ε6 is an integer of 0 or more.

Embodiment 8

The curable composition according to any one of Embodiments 1 to 7, comprising 0.1 to 30 parts by mass of the organosilicon compound based on 100 parts by mass of the perfluoro(poly)ether group-containing silane compound.

Embodiment 9

The curable composition according to any one of Embodiments 1 to 8, wherein a ratio of the sum of e and f to the sum of a, b, c, d, e and f is 0.80 or more.

Embodiment 10

The curable composition according to any one of Embodiments 1 to 9, wherein $X^{10}$ is a fluorine atom.

The invention claimed is:

1. A curable composition comprising:

a perfluoro(poly)ether group-containing silane compound which is a compound having two or more Si atoms each bonding to at least one group selected from the group consisting of a hydroxyl group and a hydrolyzable group, and a perfluoro(poly)ether group, wherein the perfluoro(poly)ether group is a group represented by formula:

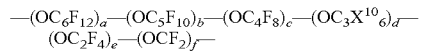
—(OC$_6$F$_{12}$)$_a$—(OC$_5$F$_{10}$)$_b$—(OC$_4$F$_8$)$_c$—(OC$_3$X$^{10}$$_6$)$_d$—(OC$_2$F$_4$)$_e$—(OCF$_2$)$_f$— wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.2 or more and 1.5 or less, a ratio of the sum of e and f to the sum of a, b, c, d, e and f is 0.80 or more, and each $X^{10}$, at each occurrence, is independently a hydrogen atom, a fluorine atom or a chlorine atom;

an organosilicon compound having at least two —O—$R^{g3}$(s) each bonding to a Si atom, wherein each $R^{g3}$, at each occurrence, is independently a hydrogen atom or a monovalent organic group; and a catalyst.

2. The curable composition according to claim 1, wherein the perfluoro(poly)ether group-containing silane compound is at least one perfluoro(poly)ether group-containing silane compound represented by formula (A), (B), (C) or (D):

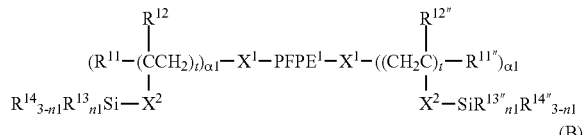
(A)

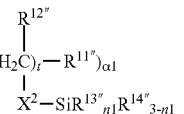

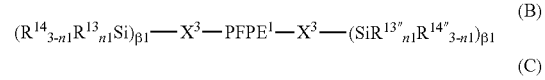
(B)

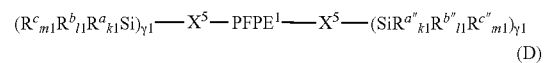
(C)

(D)

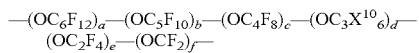

wherein:

each PFPE$^1$, at each occurrence, is independently a group represented by formula:

—(OC$_6$F$_{12}$)$_a$—(OC$_5$F$_{10}$)$_b$—(OC$_4$F$_8$)$_c$—(OC$_3$X$^{10}$$_6$)$_d$—(OC$_2$F$_4$)$_e$—(OCF$_2$)$_f$— wherein a, b, c and d are each independently an integer of 0 or more and 30 or less, e and f are each independently an integer of 1 or more and 200 or less, the sum of a, b, c, d, e and f is at least 5 or more, the occurrence order of the respective repeating units in parentheses with the subscript a, b, c, d, e or f is not limited in the formula, a ratio of e to f is 1.2 or more and 1.5 or less, a ratio of the sum of e and f to the sum of a, b, c, d, e and f is 0.80 or more, and each $X^{10}$, at each occurrence, is independently a hydrogen atom, a fluorine atom or a chlorine atom;

each $R^{13}$, at each occurrence, independently represents a hydroxyl group or a hydrolyzable group;

each $R^{14}$, at each occurrence, independently represents a hydrogen atom or an alkyl group having 1 to 22 carbon atoms;

each $R^{11}$, at each occurrence, independently represents a hydrogen atom or a halogen atom;

each $R^{12}$, at each occurrence, independently represents a hydrogen atom or a lower alkyl group;

$R^{11''}$, $R^{12''}$, $R^{13''}$ and $R^{14'}$ have the same meanings as $R^{11}$, $R^{12}$, $R^{13}$ and $R^{14}$, respectively;

n1 with respect to each (—SiR$^{13}$$_{n1}$R$^{14}$$_{3-n1}$) unit or each (—SiR$^{13''}$$_{n1}$R$^{14''}$$_{3-n1}$) unit is independently an integer of 0 to 3;

provided that at least two $R^{13}$ groups, or at least two $R^{13''}$ groups, or at least one $R^{13}$ group and at least one $R^{13''}$ group, at each occurrence, are each independently present in formulae (A) and (B);

each $X^1$, at each occurrence, independently represents a single bond or a di- to decavalent organic group;

each $X^2$, at each occurrence, independently represents a single bond or a divalent organic group;

each t, at each occurrence, is independently an integer of 1 to 10;

each α1, at each occurrence, is independently an integer of 1 to 9;

each $X^3$, at each occurrence, independently represents a single bond or a di- to decavalent organic group;

each β1, at each occurrence, is independently an integer of 1 to 9;

each $X^5$, at each occurrence, independently represents a single bond or a di- to decavalent organic group;

each γ1, at each occurrence, is independently an integer of 1 to 9;

each $R^a$, at each occurrence, independently represents $-Z^3-SiR^{71}_{p1}R^{72}_{q1}R^{73}_{r1}$;

each $Z^3$, at each occurrence, independently represents an oxygen atom or a divalent organic group;

each $R^{71}$, at each occurrence, independently represents $R^{a'}$;

$R^{a'}$ has the same meanings as $R^a$;

the number of Si linearly linked via a $Z^3$ group in $R^a$ is at most 5;

each $R^{72}$, at each occurrence, independently represents a hydroxyl group or a hydrolyzable group;

each $R^{73}$, at each occurrence, independently represents a hydrogen atom or a lower alkyl group;

each p1, at each occurrence, is independently an integer of 0 to 3;

each q1, at each occurrence, is independently an integer of 0 to 3;

each r1, at each occurrence, is independently an integer of 0 to 3;

each $R^{a''}$, at each occurrence, independently represents $-Z^3-SiR^{71}_{p1}R^{72''}_{q1}R^{73}_{r1}$;

$R^{72''}$ has the same meanings as $R^{72}$;

provided that the sum of p1, q1 and r1 with respect to $(-Z^3-SiR^{71}_{p1}R^{72}_{q1}R^{73}_{r1})$ or $(-Z^3-SiR^{71}_{p1}R^{72''}_{q1}R^{73}_{r1})$ is 3 and at least one q1 in formula (C) is an integer of 1 to 3;

each $R^b$, at each occurrence, independently represents a hydroxyl group or a hydrolyzable group;

each $R^c$, at each occurrence, independently represents a hydrogen atom or a lower alkyl group;

$R^{b''}$ and $R^{c''}$ have the same meanings as $R^b$ and $R^c$, respectively;

each k1, at each occurrence, is independently an integer of 0 to 3;

each l1, at each occurrence, is independently an integer of 0 to 3;

each m1, at each occurrence, is independently an integer of 0 to 3;

provided that the sum of k1, l1 and m1 with respect to each $(SiR^a_{k1}R^b_{l1}R^c_{m1})$ or each $(SiR^{a''}_{k1}R^{b''}_{l1}R^{c''}_{m1})$ is 3;

at least two $R^b$ groups, or at least two $R^{b''}$ groups, or at least two $R^{72}$ groups, or at least two $R^{72''}$ groups, or at least two groups selected from the group consisting of $R^b$, $R^{b''}$, $R^{72}$ and $R^{72''}$ are present in (C);

each $X^7$ independently represents a single bond or a di- to decavalent organic group;

each δ1 is independently an integer of 1 to 9;

each $R^d$, at each occurrence, independently represents $-Z^4-CR^{81}_{p2}R^{82}_{q2}R^{83}_{r2}$;

each $Z^4$, at each occurrence, independently represents an oxygen atom or a divalent organic group;

each $R^{81}$, at each occurrence, independently represents $R^{d'}$;

$R^{d'}$ has the same meanings as $R^d$;

the number of C linearly linked via a $Z^4$ group in $R^d$ is at most 5;

each $R^{82}$, at each occurrence, independently represents $-Y-SiR^{85}_{n2}R^{86}_{3-n2}$;

each Y, at each occurrence, independently represents a divalent organic group;

each $R^{85}$, at each occurrence, independently represents a hydroxyl group or a hydrolyzable group;

each $R^{86}$, at each occurrence, independently represents a hydrogen atom or a lower alkyl group;

each $R^{83}$, at each occurrence, independently represents a hydrogen atom or a lower alkyl group;

each p2, at each occurrence, is independently an integer of 0 to 3;

each q2, at each occurrence, is independently an integer of 0 to 3;

each r2, at each occurrence, is independently an integer of 0 to 3;

each $R^{d''}$, at each occurrence, independently represents $-Z^4-CR^{81}_{p2}R^{82''}_{q2}R^{83}_{r2}$;

$R^{82''}$ represents $-Y-SiR^{85''}_{n2}R^{86''}_{3-n2}$;

provided that the sum of p2, q2 and r2 with respect to $(-Z^4-CR^{81}_{p2}R^{82}_{q2}R^{83}_{r2})$ or $(-Z^4-CR^{81}_{p2}R^{82''}_{q2}R^{83}_{r2})$ is 3;

n2 with respect to a $(-Y-SiR^{85}_{n2}R^{86}_{3-n2})$ unit or a $(-Y-SiR^{85''}_{n2}R^{86''}_{3-n2})$ unit independently represents an integer of 0 to 3;

$R^{85''}$ and $R^{86''}$ have the same meanings as $R^{85}$ and $R^{86}$, respectively;

each $R^e$, at each occurrence, independently represents $-Y-SiR^{85}_{n2}R^{86}_{3-n2}$;

each $R^{e''}$, at each occurrence, independently represents $-Y-SiR^{85''}_{n2}R^{86''}_{3-n2}$;

each $R^f$, at each occurrence, independently represents a hydrogen atom, a hydroxyl group or a lower alkyl group;

$R^{f''}$ has the same meanings as $R^f$;

each k2, at each occurrence, is independently an integer of 0 to 3;

each l2, at each occurrence, is independently an integer of 0 to 3; and each m2, at each occurrence, is independently an integer of 0 to 3;

provided that the sum of k2, l2 and m2 with respect to $(CR^d_{k2}R^e_{l2}R^f_{m2})$ or $(CR^{d''}_{k2}R^{e''}_{l2}R^{f''}_{m2})$ is 3, and two or more groups selected from the group consisting of a group represented by $-Y-SiR^{85}_{n2}R^{86}_{3-n2}$ wherein n2 is 1 or more and a group represented by $-Y-SiR^{85''}_{n2}R^{86''}_{3-n2}$ wherein n2 is 1 or more are present in formula (D).

3. The curable composition according to claim 1, wherein such a Si atom bonding to at least one group selected from the group consisting of a hydroxyl group and a hydrolyzable group is present at each of both ends of a molecular backbone of the perfluoro(poly)ether group-containing silane compound.

4. The curable composition according to claim 1, wherein the catalyst is at least one selected from the group consisting of a metal-based catalyst, an organic acid-based catalyst, an inorganic acid-based catalyst and a basic catalyst.

5. The curable composition according to claim 1, wherein the catalyst is a metal-based catalyst comprising a titanium atom, a zirconium atom or a tin atom.

6. The curable composition according to claim 1, comprising 0.1 to 5.0 parts by mass of the catalyst based on 100 parts by mass of the perfluoro(poly)ether group-containing silane compound.

7. The curable composition according to claim 1, wherein the organosilicon compound comprises an organosilicon compound represented by any of the following formulae (E1) to (E5):

(E1)

-continued

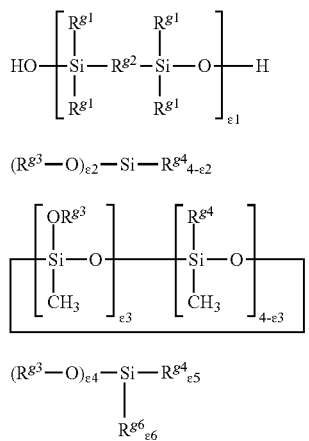

(E2)

(E3)

(E4)

(E5)

wherein:
- each $R^{g1}$, at each occurrence, is independently a substituted or unsubstituted monovalent hydrocarbon group having 1 to 8 carbon atoms;
- each $R^{g2}$, at each occurrence, is independently substituted or unsubstituted and has 1 to 20 carbon atoms;
- each $R^{g3}$, at each occurrence, is independently a hydrogen atom or a monovalent organic group;
- each $R^{g4}$, at each occurrence, is independently a monovalent organic group;
- $R^{g6}$ represents $R^{g8}$—$R^{g7}$—;
- each $R^{g7}$, at each occurrence, independently represents a single bond, an oxygen atom or a divalent organic group;
- each $R^{g8}$, at each occurrence, is independently an amino group, an epoxy group, a methacrylic group, a vinyl group or a mercapto group;
- each ε1, at each occurrence, is independently an integer of 1 or more;
- each ε2, at occurrence, is independently 2 or 3;
- each ε3, at each occurrence, is independently 2 or 3;
- ε4 is an integer of 2 or more;
- ε5 is 1 or 2; and
- ε6 is an integer of 0 or more.

8. The curable composition according to claim 1, comprising 0.1 to 30 parts by mass of the organosilicon compound based on 100 parts by mass of the perfluoro(poly)ether group-containing silane compound.

9. The curable composition according to claim 1, wherein $X^{10}$ is a fluorine atom.

* * * * *